US009963160B2

(12) United States Patent
Opsvik

(10) Patent No.: US 9,963,160 B2
(45) Date of Patent: May 8, 2018

(54) COMBINED SCOOTER AND HANDCART

(71) Applicant: Peter Opsvik, Oslo (NO)

(72) Inventor: Peter Opsvik, Oslo (NO)

(73) Assignee: PETER OPSVIK AS, Oslo (NO)

( * ) Notice: Subject to any disclaimer, the term of this patent is extended or adjusted under 35 U.S.C. 154(b) by 0 days. days.

(21) Appl. No.: 15/034,397

(22) PCT Filed: Nov. 4, 2014

(86) PCT No.: PCT/IB2014/065785
§ 371 (c)(1),
(2) Date: May 4, 2016

(87) PCT Pub. No.: WO2015/063745
PCT Pub. Date: May 7, 2015

(65) Prior Publication Data
US 2016/0297459 A1 Oct. 13, 2016

(30) Foreign Application Priority Data
Nov. 4, 2013 (NO) .................................. 20131459

(51) Int. Cl.
B62B 3/02 (2006.01)
B62K 3/00 (2006.01)
(Continued)

(52) U.S. Cl.
CPC .............. *B62B 3/022* (2013.01); *B62B 1/002* (2013.01); *B62B 1/008* (2013.01); *B62B 1/12* (2013.01);
(Continued)

(58) Field of Classification Search
CPC ........... B62B 3/022; B62B 1/12; B62B 1/002; B62B 1/008; B62B 2206/006; B62K 3/002; B62K 15/006
See application file for complete search history.

(56) References Cited

U.S. PATENT DOCUMENTS 5,820,146 A * 10/1998 Van Ligten ............. B62B 1/002
280/47.19
6,460,866 B1 * 10/2002 Altschul ................... A45F 4/02
150/159
(Continued)

FOREIGN PATENT DOCUMENTS

CN 203369498 U * 1/2014
DE 31 38 095 A1 4/1983
(Continued)

OTHER PUBLICATIONS

International Search Report issued in PCT/IB2014/065785 dated Feb. 4, 2015 (2 pages).
(Continued)

Primary Examiner — Jacob B Meyer
(74) Attorney, Agent, or Firm — Osha Liang LLP

(57) ABSTRACT

A combined device is adjusted between a scooter position and a handcart position. The combined device includes a front part provided with a steering assembly and at least one front wheel, and a rear part provided with at least one rear wheel. The front part is rotatably connected to the rear part in one pivot joint, or in a plurality of pivot joints having a common axis of rotation, such that on adjustment from scooter position to handcart position, the at least one rear wheel and the at least one front wheel are pivoted towards and against each other.

20 Claims, 24 Drawing Sheets

(51) Int. Cl.
  *B62K 15/00*   (2006.01)
  *B62B 1/00*    (2006.01)
  *B62B 1/12*    (2006.01)

(52) U.S. Cl.
  CPC ............ *B62K 3/002* (2013.01); *B62K 15/006* (2013.01); *B62B 2206/006* (2013.01)

(56) References Cited

U.S. PATENT DOCUMENTS

| | | | | |
|---|---|---|---|---|
| 7,029,015 | B2* | 4/2006 | Lin | A45C 9/00 190/18 A |
| 7,063,341 | B2* | 6/2006 | Tsai | B62K 3/002 16/359 |
| 7,134,677 | B2* | 11/2006 | Opsvik | B62K 3/002 280/87.041 |
| 7,143,912 | B2* | 12/2006 | Caneba | A45C 13/262 224/153 |
| 7,431,311 | B2* | 10/2008 | Turner | A45F 3/04 190/18 A |
| 7,461,715 | B1* | 12/2008 | Tsai | B62K 5/025 180/208 |
| 8,201,837 | B2* | 6/2012 | Dweek | A45C 5/146 224/153 |
| 8,282,109 | B1* | 10/2012 | Arjomand | A45F 4/02 280/30 |
| 8,459,679 | B2* | 6/2013 | Jessie, Jr. | B62K 15/006 280/282 |
| 8,534,405 | B2* | 9/2013 | Kim | B62H 1/00 180/205.1 |
| 9,033,350 | B2* | 5/2015 | Porri | A45C 5/146 280/37 |
| 9,265,675 | B2* | 2/2016 | Ransenberg | B62K 15/008 |
| 9,357,828 | B2* | 6/2016 | Onessimo | A45F 3/04 |
| 9,364,060 | B2* | 6/2016 | Bristol | B62B 5/068 |
| 9,545,970 | B2* | 1/2017 | Ferret | B62K 3/002 |
| 2003/0141121 | A1* | 7/2003 | Flowers | A61G 5/045 180/65.1 |
| 2010/0126789 | A1* | 5/2010 | Scragg | B62K 5/01 180/208 |
| 2011/0155527 | A1* | 6/2011 | Veal | A45C 5/14 190/18 A |
| 2012/0013089 | A1* | 1/2012 | Reeves | B62B 1/12 280/47.26 |
| 2012/0286011 | A1* | 11/2012 | Wegener | A45C 13/02 224/627 |
| 2014/0061267 | A1* | 3/2014 | Turner | B62K 3/002 224/413 |
| 2014/0077476 | A1* | 3/2014 | Kosco | B62K 5/025 280/639 |
| 2015/0034402 | A1* | 2/2015 | Dourado | A45F 3/04 180/181 |
| 2016/0297459 | A1* | 10/2016 | Opsvik | B62K 3/002 |

FOREIGN PATENT DOCUMENTS

| | | | |
|---|---|---|---|
| DE | 296 10 975 U1 | 12/1996 | |
| DE | 297 15 152 U1 | 12/1997 | |
| DE | 102 04 478 A1 | 8/2003 | |
| DE | 102006042119 A1 * | 3/2007 | |
| EP | 1864896 A1 * | 12/2007 | ............. A45C 5/14 |
| EP | 2 514 661 A1 | 10/2012 | |
| FR | 2 818 100 A1 | 6/2002 | |
| WO | 03/093093 A1 | 11/2003 | |
| WO | WO-2006031128 A1 * | 3/2006 | ............. B62K 3/002 |

OTHER PUBLICATIONS

Written Opinion of the International Searching Authority issued in PCT/IB2014/065785 dated Feb. 4, 2015 (4 pages).
International Preliminary Report on Patentability from PCT/IB2014/065785 dated Jan. 21, 2016 (13 pages).
Norwegian Search Report issued in Patent application No. 20131459 dated Apr. 23, 2014 (2 pages).

* cited by examiner

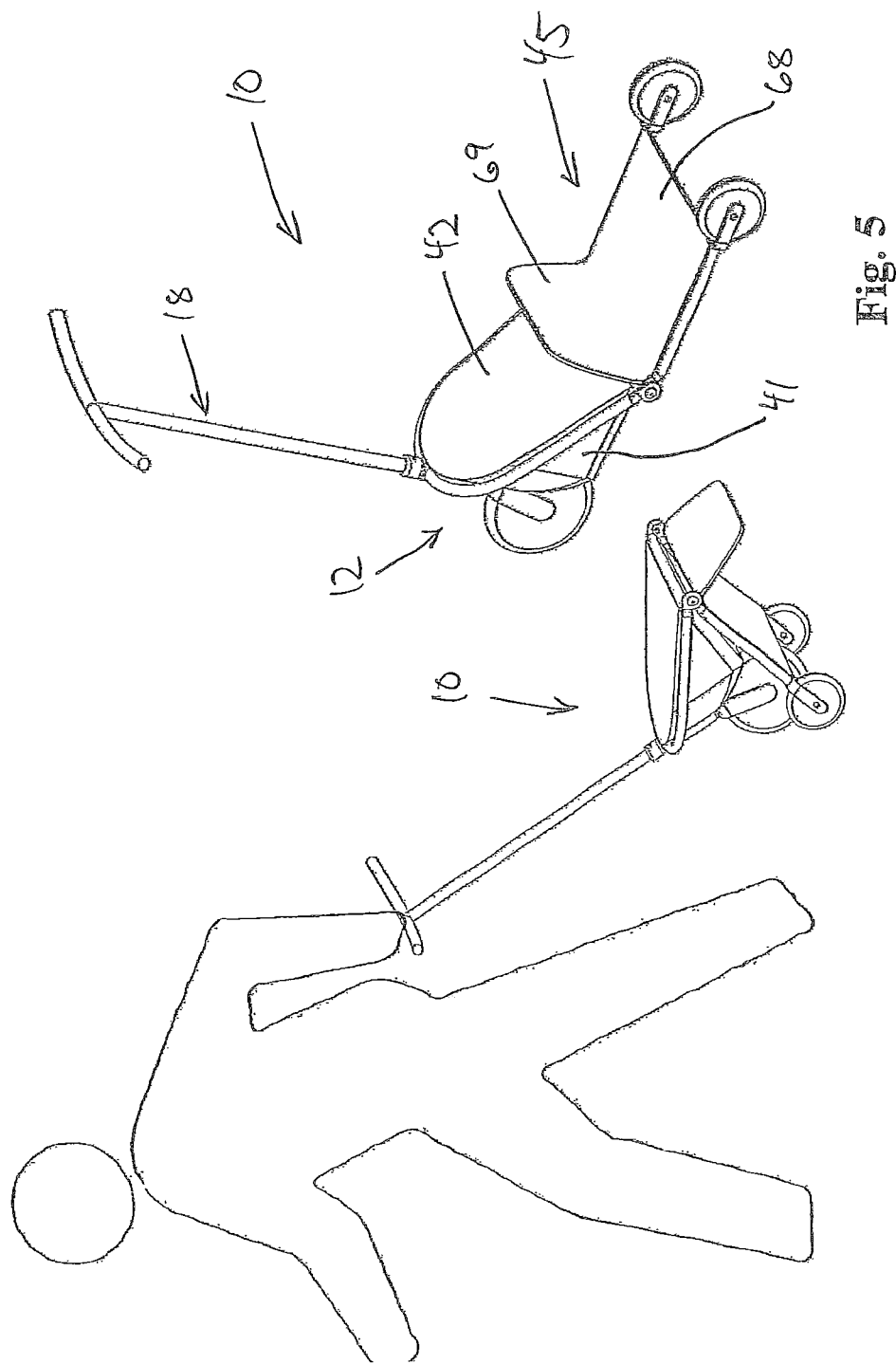

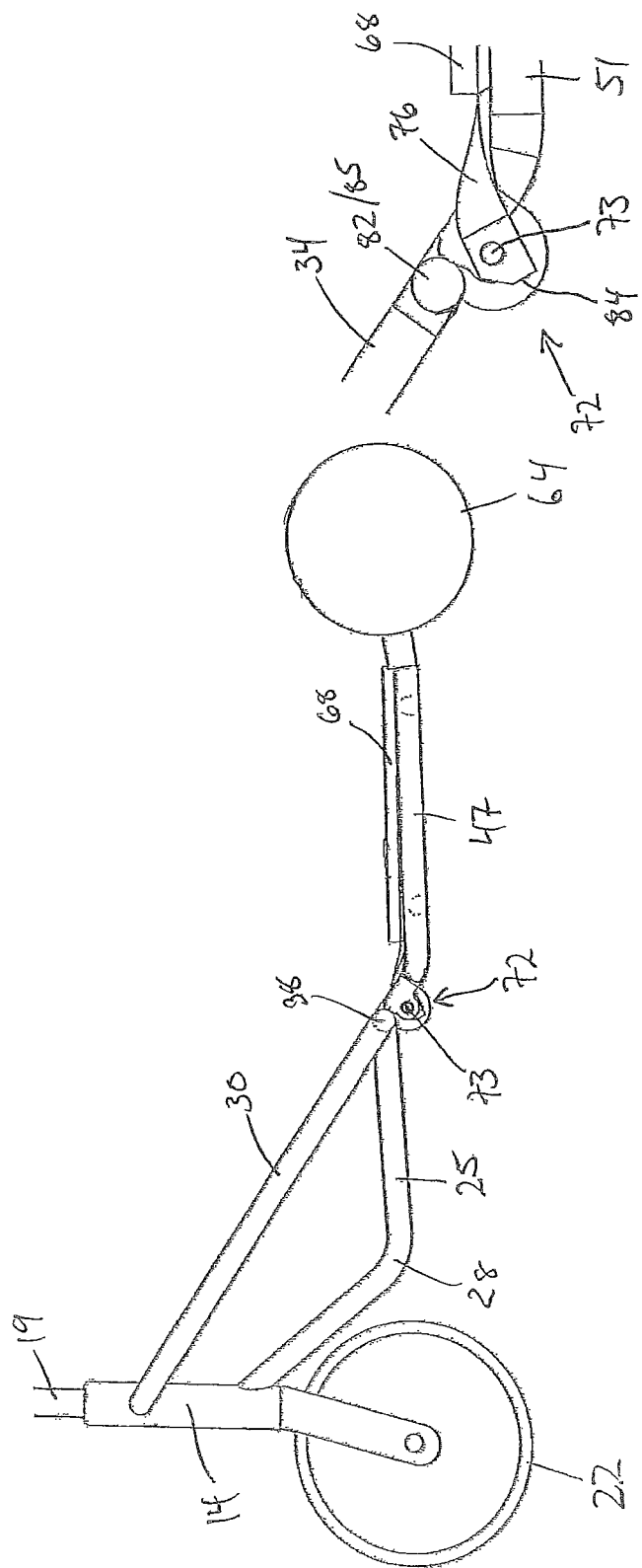

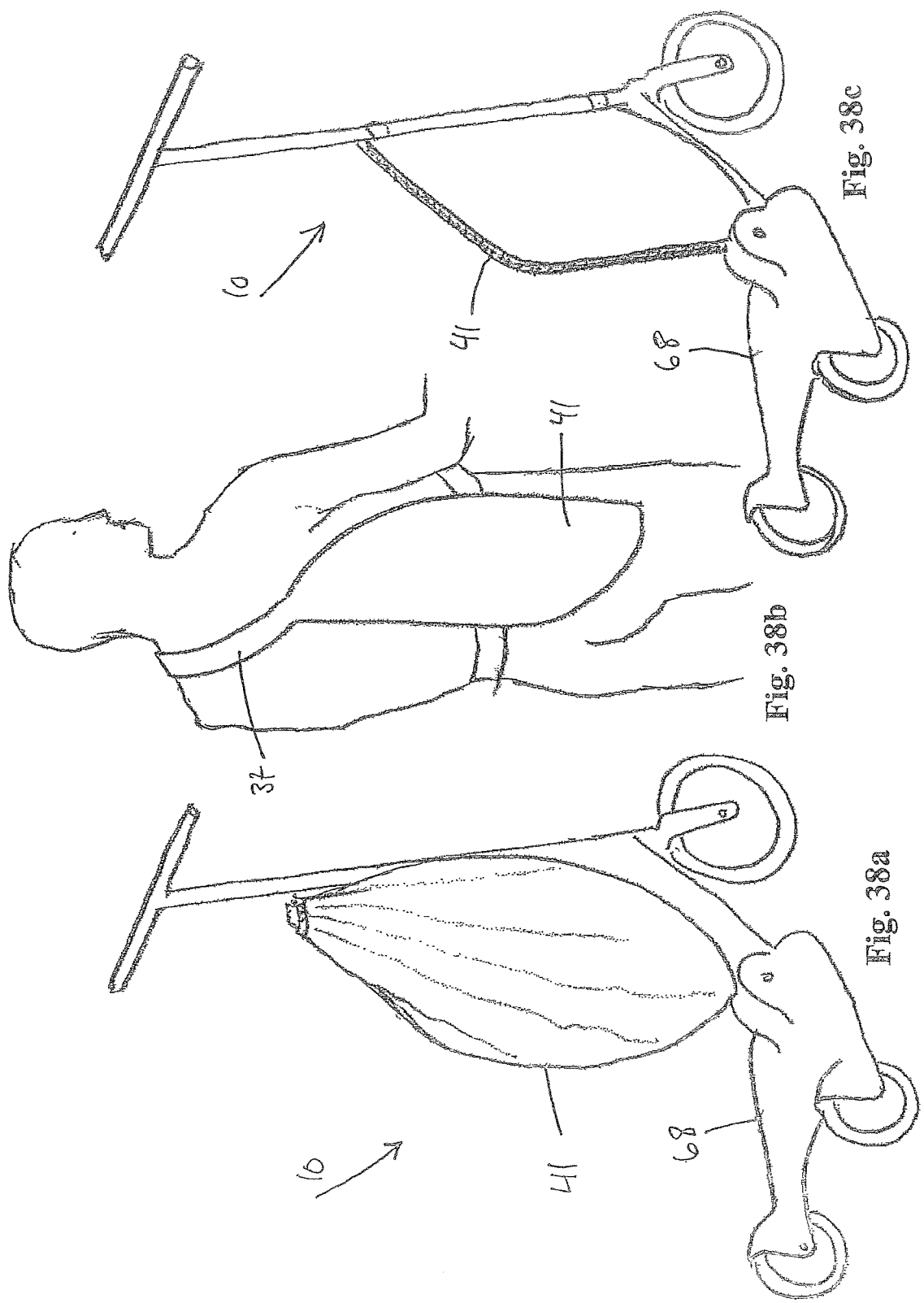

COMBINED SCOOTER AND HANDCART

The present device relates to an urban combined means of personal transport and means of transport for goods. More specifically, the present device relates to a combined device that is adjustable between a scooter position in which the device functions as a scooter, optionally with a motor for propulsion, and a handcart position in which the device functions as a handcart.

Scooters are used as a means of transport to cover short distances more quickly than when walking, or they are used in play.

Known means of personal transport that are smaller than a car all have the disadvantage that they are not easy to handle if the user is to take the means of transport with him onto to means of public transport or into buildings. To find suitable and secure places in which to lock these small vehicles out of door can be a major problem. The present device can accompany the user throughout the day in a selected form of either scooter or handcart.

When, for example, the user is to go indoors into a shop, it may be problematic and time-consuming to find a suitable place in which to leave the scooter outside, and in addition there is the danger of theft. To take the scooter around in the shop at the same time as pushing a trolley for goods can be a challenge. It is therefore desirable to have a device that can be used as a scooter with storage space and that can easily be folded into a trolley or handcart having the same space for goods.

Devices are known where a scooter can be folded up so as to take up less space and/or that may have space for securing a suitcase or the like on the front of the handlebars. Some examples of such devices are shown in EP 2 514 661 A1, DE 297 15 152 U1, FR 2 818 100, DE 102 04 478 A1 and DE 31 38 095 A1. The disadvantage of the known scooters is, inter alia, that they have two or more joints and that the part on which a user stands is pivoted up along the handlebars. This means that luggage must be placed on the front of the handlebars, which makes the scooter unstable and unsteady. With more joints and often complex mechanics, there are also several components that may break and that require maintenance.

In general, the object of the invention has therefore been to produce a single means of personal transport/goods transport that is capable of accompanying the user out of doors as a handcart or as a scooter, and which, when folded, can easily be taken on board another means of transport in order to be unfolded into a scooter again at the user's place of arrival.

The present invention has therefore had the object of providing a simpler design that can readily be adjusted between a scooter position and a handcart position.

It has also been an object of the present invention to provide a design capable of functioning well both as scooter and as handcart.

This is achieved by means of a combined device as defined in independent claim 1. Additional embodiments of the invention are defined in dependent claims 2-16.

A combined device is provided that is designed to be adjusted between a scooter position and a handcart position. The combined device comprises a front part provided with a steering assembly and at least one front wheel, and a rear part provided with at least two rear wheels. The front part is rotatably connected to the rear part in one pivot joint, optionally in a plurality of pivot joints, the pivot joints having a common axis of rotation, such that on adjustment from the scooter position to the handcart position, the rear wheels and the at least one front wheel are rotated towards and against each other, i.e., the rear wheels are pivoted in towards the at least one front wheel, or vice versa, or that both the at least one front wheel and the rear wheels are pivoted in towards each other, such that the rear wheels are in contact with the underlying surface in the handcart position, and such that the combined device is wheeled on the rear wheels in the handcart position.

As handcart, it is placed on the floor in front of a seat on a train or bus, and at the place of arrival the product can be unfolded and again used as a scooter or pulled along as a handcart. If the final destination is a place of work, the product can stand next to the desk. A variant of the combined device equipped with an electric motor can then be put on charge.

In a practical embodiment, the rear wheels are preferably pivoted in towards and against the at least one front wheel so that the rear wheels lie wholly or partly under the at least one front wheel in the handcart position. Thus, the combined device is wheeled on the rear wheels in the handcart position. The combined device is preferably provided with two rear wheels and one front wheel. This makes the combined device sufficiently stable in the handcart position whilst being easy to steer in the scooter position. In practice, the axis of rotation of the at least one front wheel and the axis of rotation of the rear wheels will then be pivoted in towards each other and lie as close to each other as practically possible in the handcart position.

In the handcart position, the combined device can preferably stand in an upright handcart position, i.e., the steering assembly is substantially vertical or close to vertical. In this position, the combined device can stand alone on one or more of the wheels and with the aid of, for example, a plate means having a support part. The support part may be rotatably connected to the pivot joint or be a fixed part of the plate means. On adjustment from the scooter position to the handcart position, the rear wheels will be pivoted towards and under the at least one front wheel seen in relation to the position of the front part in the scooter position and the handcart position.

The steering assembly preferably comprises a steering column which, in the scooter position, is upright relative to an underlying surface on which the combined device is standing, and which is connected to the at least one front wheel at the lower end of the steering column. The front part may further comprises a steering guide that is fixedly connected to the front part, the steering column being rotatably arranged in the steering guide around the longitudinal axis of the steering column through the steering guide.

The pivot joint or pivot joints can in an embodiment comprise two inner elements which are fixedly connected to the front part and two outer elements that are arranged on opposite sides of their respective inner element and are secured to the rear part, and where the inner elements and/or the outer elements are rotatable about the axis of rotation of the pivot joint. The inner elements and/or the outer elements are preferably rotatably arranged on a shaft. The axis of rotation of the shaft will then coincide with the axis of rotation of the pivot joint. The inner elements may be plate-like elements. The outer elements may also be plate-like elements.

The inner elements preferably comprise a projection and the outer elements preferably comprise a corresponding depression into which the projections of the respective outer elements project and move along when the combined device is adjusted between the scooter position and the handcart position. The length of the depression is preferably such that the projections butt against respective ends of the depressions in, respectively, the scooter position and the handcart position. In an embodiment, the projections may be in the form of pins whilst the depressions then may be in the form of grooves or recesses having a shape that corresponds to the shape of the pins.

The pivot joint is preferably provided with a locking mechanism, for example, an integrated locking mechanism, which locks the front part and the rear part against relative rotation between them in respectively the scooter position and the handcart position.

For example, the inner elements may be provided with a recess and the outer elements may be provided with respective first recesses and second recesses, where the recesses of the inner element and the first recesses of the outer elements are aligned with each other when the combined device is in the scooter position, whilst the recesses of the inner elements and the second recesses of the outer elements are aligned with each other when the combined device is in the handcart position. The pivot joint further comprises a movably arranged locking element with locking element projection which has a shape that is adapted to the recesses and which can be placed in the aligned recesses in respectively the scooter position and the handcart position so as to lock the front part and the rear part against relative movement between them.

In another embodiment, the locking mechanism may be shaped liked an anchor that is rotatably arranged on the front part, the anchor being adapted to engage with a first locking element in the scooter position and a second locking element in the handcart position, the first locking element and the second locking element being arranged on the rear part.

The combined device preferably also comprises a plate means that is connected or secured to the rear part and/or to the pivot joint or joints such that a user can stand on the plate means in the scooter position and such that the whole plate means or a part thereof functions as a support for the combined device when it is in an upright handcart position.

In an embodiment, the plate means may comprise a foot part on which a user can stand in the scooter position and a support part that projects up from the foot part so that the support part functions as support in an upright handcart position. The foot part and the support part of the plate means may be configured in a single piece.

In another embodiment, the plate means may comprise a support part that is pivotally connected to the pivot joint or joints such that the support part functions as a support in an upright handcart position. In addition, the plate means has at least one separate foot part that is secured to the rear part and on which a user can stand in the scooter position.

In another embodiment of the plate means, the plate means may comprise a support part that is pivotally connected to the pivot joint or joints such that the support part functions as a support in the upright handcart position. The plate means can in its entirety be constituted of the support part and be adapted such that a user can stand on the support part in the scooter position.

Alternatively, the plate means may comprise the support part and a separate foot part that is preferably attached to the rear part, the support part lying in a recess in the foot part in the scooter position. The support part is preferably connected to the pivot joint or joints and on adjustment to the handcart position, the support part is flipped out of the recess and rotated until a certain point in which respective stop faces on the support part and the front part or the pivot joint or joints abut against each other and prevent further rotation of the support part.

The combined device can comprise one, but preferably two, elongate fastening members which at one end are connected to the support part and which at the other end are connected to the pivot joint or respective pivot joints. A first fastening member end portion is preferably turned 90° about the longitudinal direction of the fastening member relative to a second fastening member end portion. The fastening members are preferably configured with a fastening member stop face that is adapted so that the fastening member stop face abuts against a fastening member stop element and limits the rotation of the support plate when the combined device is adjusted from the scooter position to the handcart position, where the fastening member stop element is arranged on the front part of the combined device.

Alternatively, the support part may be configured with a stop face that comes into abutment against a corresponding stop face on the front part before rotation from scooter position to handcart position is completed, so that the support part is prevented from following the further rotation of the rear part towards the front part, whereby the support part thus functions as a support in the upright handcart position.

The front part of the combined device is further preferably provided with a storage unit behind the handlebars of the combined device, seen in relation to the longitudinal direction of the combined device in the scooter position, for storage of different items during transport. The storage unit may be configured such that in the unit there is provided a storage bag adapted to be capable of being stored in the storage unit and pulled out or up and fastened to the steering assembly. Alternatively, the storage unit can be designed such that it is able to assume different configurations depending on use, for example, it may be a bag for the transport of goods when it is fastened to the combined device, and a shoulder bag when the storage unit is taken off the combined device.

The rear wheels can preferably be provided with a brake that is operated from the handlebars of the combined device.

In an embodiment, the combined device comprises one front wheel and at least two rear wheels, the rear wheels having a common axis of rotation.

The handlebars of the combined device can be detachably arranged on the front part of the combined device. It should also be mentioned that the combined device preferably has direct steering, i.e., that the front wheel is fastened directly to the steering column of the steering assembly such that when the steering column is turned about its longitudinal axis, the front wheel or wheels will also be turned correspondingly.

The different embodiments of the invention will be described below with reference to the figures, wherein:

FIGS. 4-7 are further perspective views of the first invention in the scooter position and in the handcart position, FIGS. 6-7 without a storage unit.

FIG. 18 is a side view of a section of the second embodiment of the invention in a scooter position.

FIG. 19 shows the pivot joint that connects the front part and the rear part of the combined device in a scooter position.

FIGS. 38a-c show the third embodiment of the invention with a storage unit that is configured such that the size/volume of the storage unit can be adjusted in relation to how it is to be used.

Figure 39A:
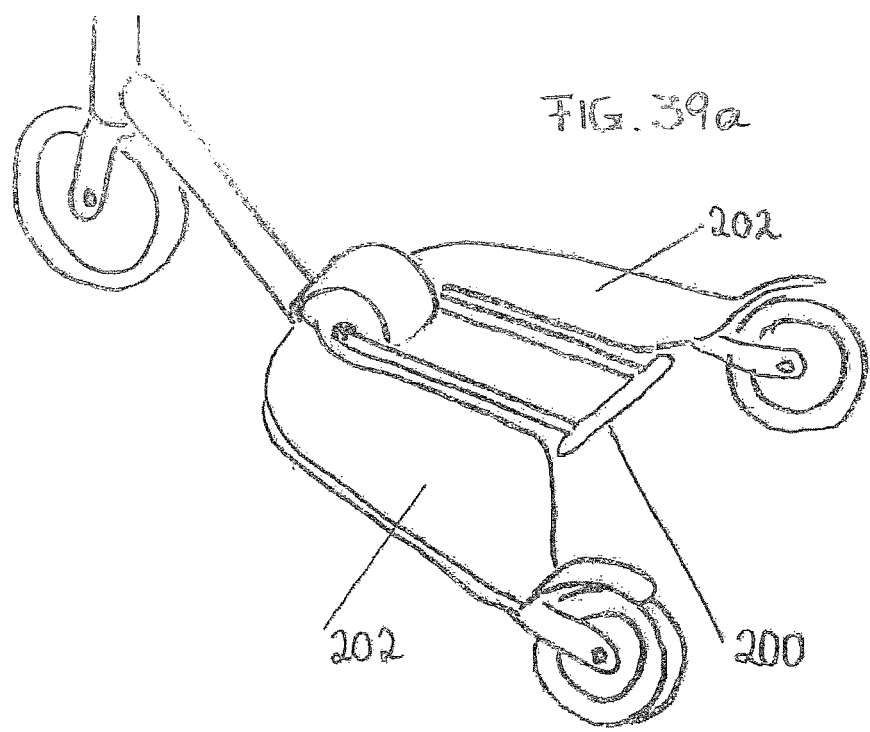
Figure 39B:
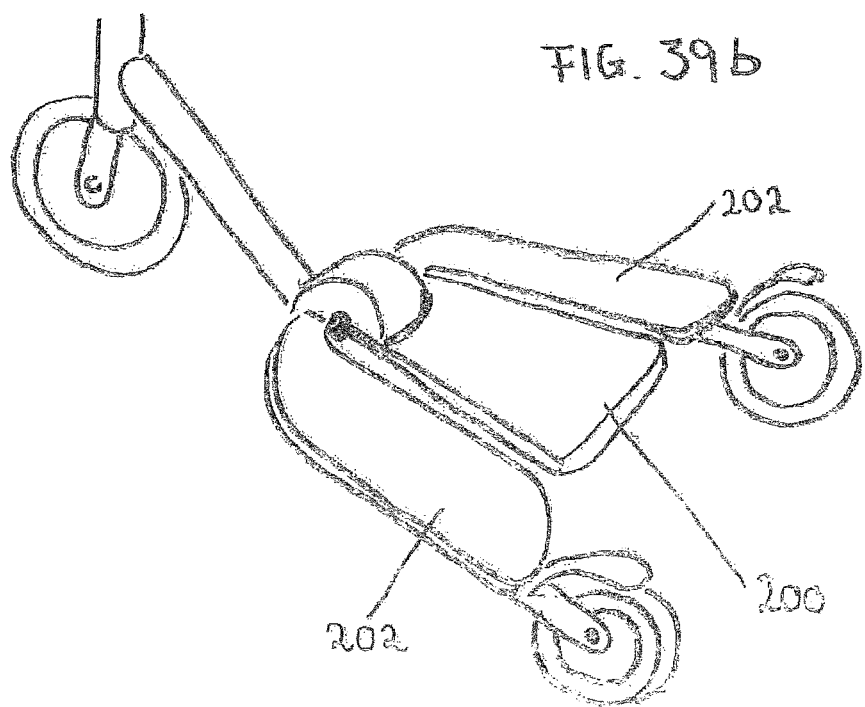

FIGS. 39a-b show two embodiments of the combined device where the plate means comprises separate foot part and support plate.

Three embodiments of the present invention will be described below, a first embodiment as shown in FIGS. 1-13, a second embodiment as shown in FIGS. 14-27 and a third embodiment as shown in FIGS. 33-38. The three embodiments are based on the same solution for adjusting the combined device between a scooter position and a handcart position, but have slightly different detailed solutions.

FIGS. 1-13 illustrate the first embodiment of a combined device 10. The combined device 10 comprises a front part 12 and a rear part 45 that are rotatably connected in two pivot joints 72. The two pivot joints 72 have a common axis of rotation A as indicated in FIGS. 8-12. By turning the rear part 45 relative to the front part 12 about the axis A, the combined device 10 can be adjusted from a scooter position, in which a user can employ the combined device 10 as a scooter, and a handcart position in which the user can employ the combined device 10 as a handcart or trolley, for example, in a shop. The difference between the scooter position and the handcart position of the combined device 10 can be seen clearly in FIGS. 4 and 5.

The front part 12 is configured with a frame comprising a steering guide 14 which at its lower end is connected to a front wheel fork 23. A front wheel 22 is mounted to the front wheel fork 23. The front wheel fork 23 is secured to a steering guide 14 that is preferably configured having a cylindrical hole in which the steering assembly 18 of the combined device can be arranged. The steering assembly 18 is arranged rotatably and preferably removably in the steering guide 14. This will facilitate storage of the combined device 10. Alternatively, the steering assembly 18 can of course be permanently fastened in the steering guide 14 such that it cannot be dismantled from the front part 12.

The steering assembly 18 comprises a steering column 19 that is arranged rotatably in the steering guide 14 about the longitudinal axis of the steering column through the steering guide, and a steering handle 20 that a user employs to steer the combined device 10 when it is in use as a scooter. As shown, the steering handle is arranged transverse to the longitudinal axis of the steering column 19. The steering assembly 18 is directly or indirectly connected to the front wheel fork 23, thus enabling a user to steer the combined device 10 during use when it is employed as a scooter.

The front part 12 further comprises a first front part side bar 30 and a second front part side bar 34 which at one end are connected to the steering guide 14, for example, by welding. Each of the opposite ends of the first front part side bar 30 and the second front part side bar 34 form a part of a pivot joint 72 that connects the front part 12 and the rear part 45. A front part transverse bar 38 extends between and is fastened to the first front part side bar 30 and the second front part side bar 34, and is fastened to the front part side bars 30, 34 close to their ends, for example, by welding, such that the ends of the front part side bars 30, 34 can be configured as a part of the pivot joints 72, as shown in the figures. The front part 12 further comprises a front part central bar 25 that is arranged between the first and the second front part side bar 30, 34 and which extends between and is fastened to the steering guide 14 at one end and the front part transverse bar 38 at the other end.

The front part central bar 25 is preferably fastened lower on the steering guide 14 than the first front part side bar 30 and the second front part side bar 34. In addition, the front part central bar 25 is preferably provided with a bend 28 as shown in the figures, such that a part of the front part central bar 25 lies essentially horizontal between the bend 28 and the front part transverse bar 38. Furthermore, the first front part side bar 30 and the second front part side bar 34, seen from the side in the scooter position, are preferably arranged such that they lie level with each other (see, e.g., FIGS. 8-11). This configuration of the front part 12 means that a storage unit 41 can be arranged on the front part 12, the storage unit 41 resting on the front part central bar 25, whilst the front part side bars 30, 34 provide support to the storage unit 41 in lateral direction and a forward direction.

Figure 1:
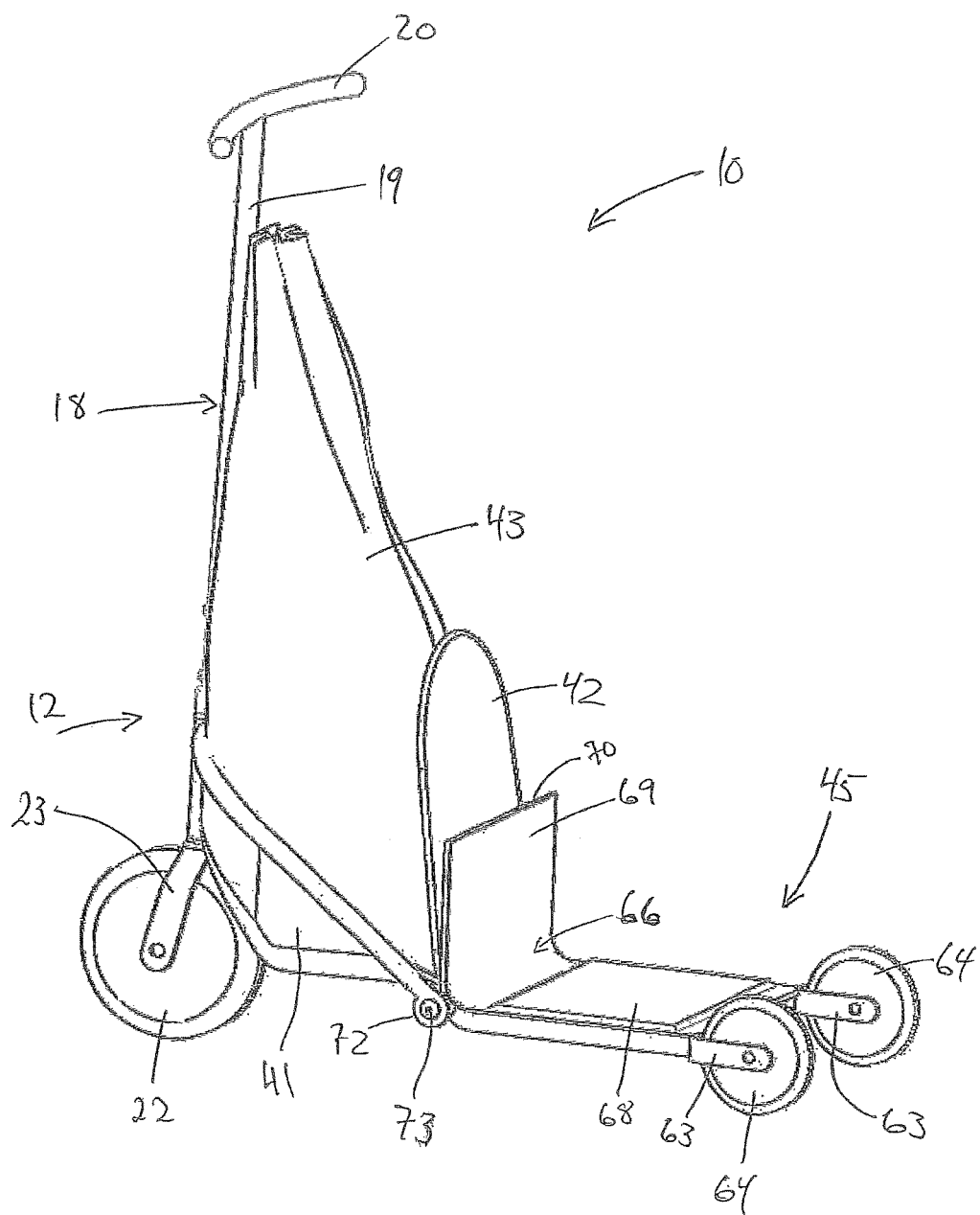
FIGS. 1-2 are perspective views of a first embodiment of the combined device with a storage bag pulled up from a storage container.
Figure 3:
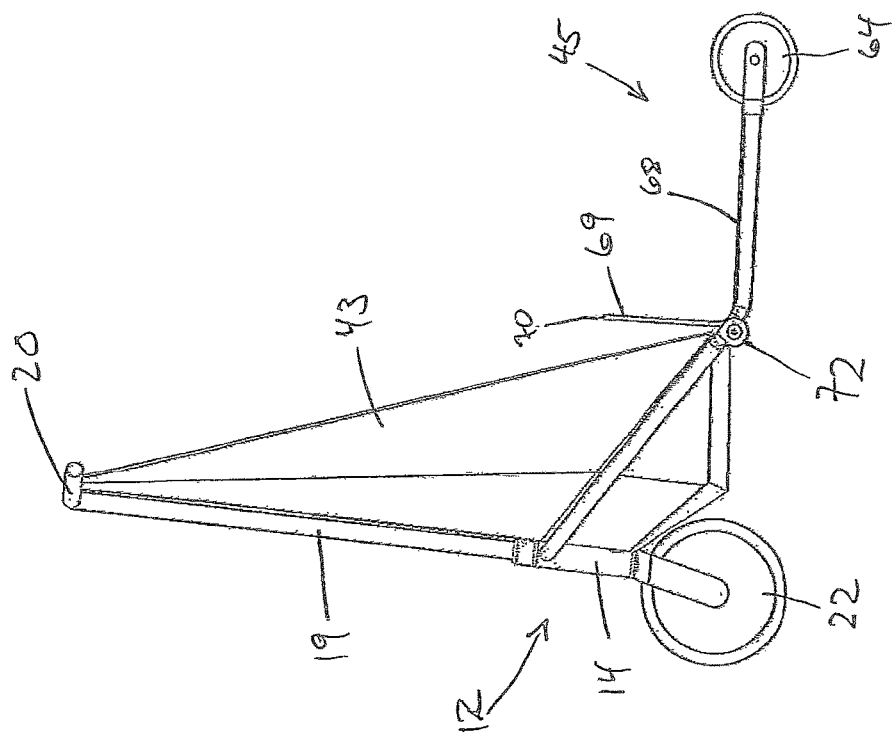
FIG. 3 is a side view of the combined device shown in FIG. 2.
Figure 2:
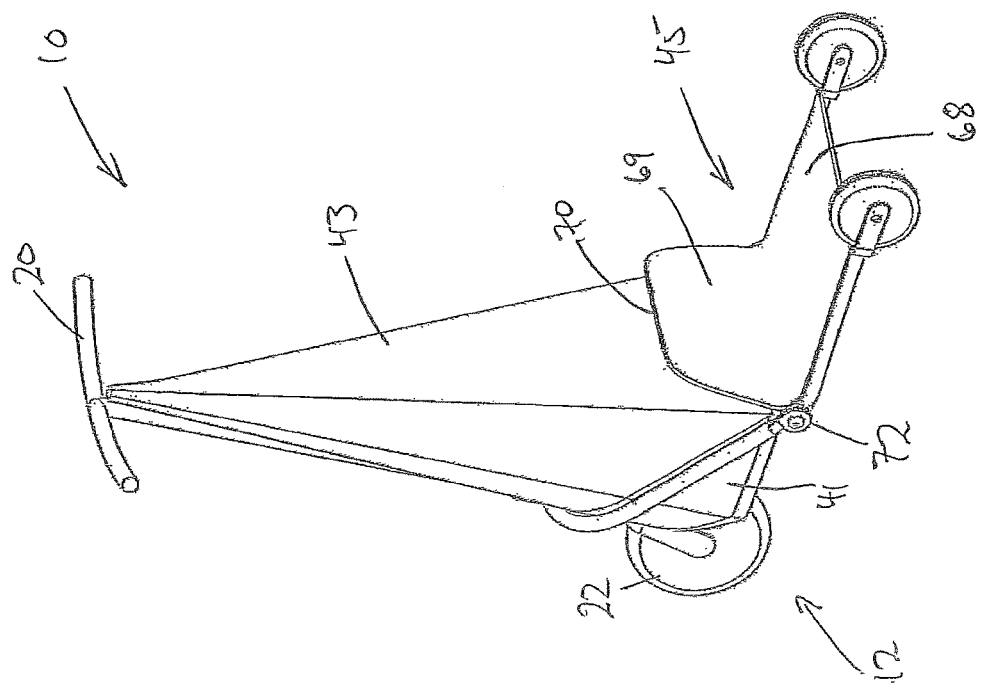
Figure 7:
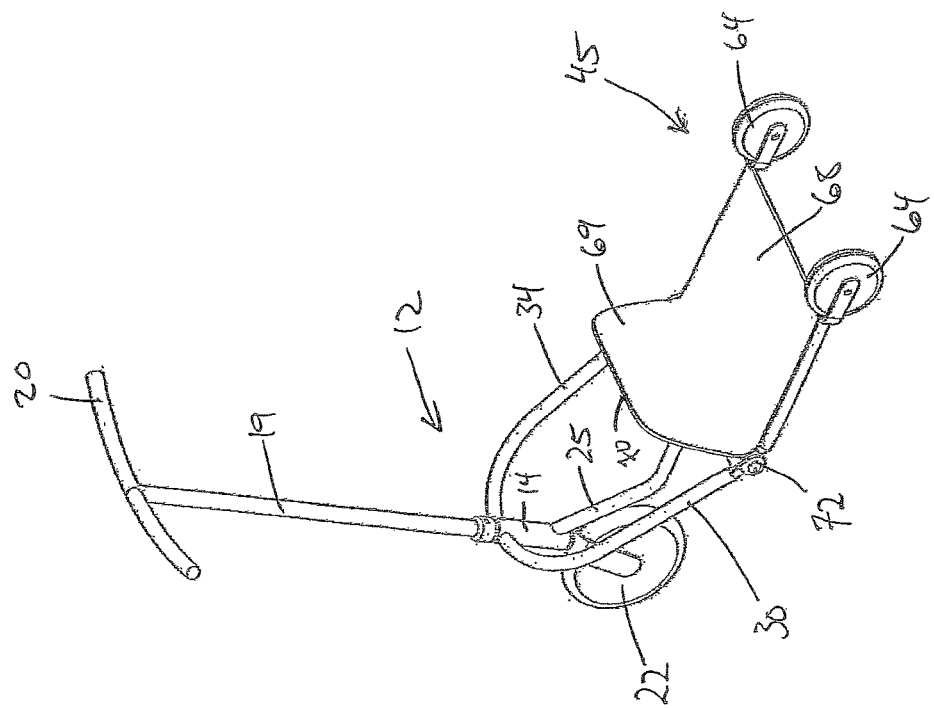
Figure 6:
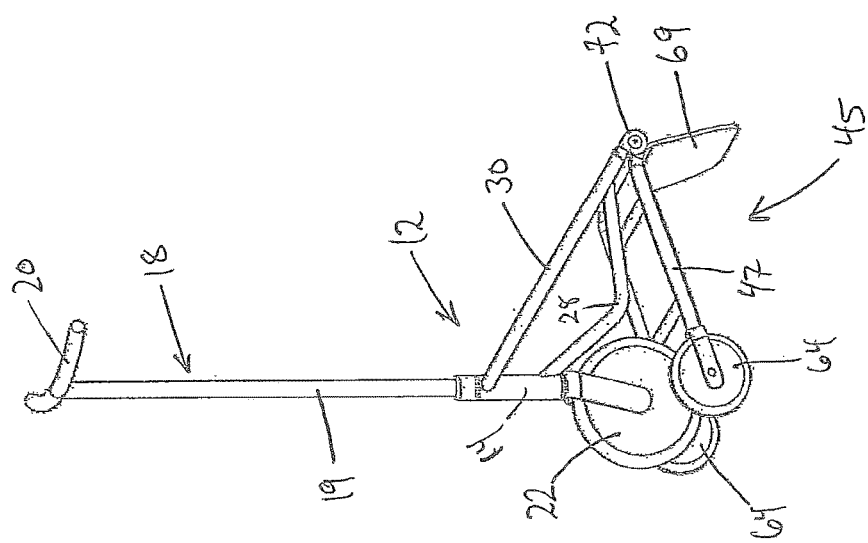

The storage unit can be provided with a lid 42 which can be pivoted up as shown in, for example, FIG. 1. The storage unit 41 can be used for transport of different articles, both when the combined device 10 is used as a scooter and when the combined device 10 is used as a handcart.

The space in such a storage unit 41, see, e.g., FIG. 4, might for some people be rather limited. An alternative is therefore to arrange a storage bag 43 in the storage unit 41. When the storage bag 43 is not in use, it is stored in the storage unit 41. When a user wishes to employ the storage bag 43, it is pulled up from the storage unit 41 and is fastened to the steering assembly 18, for example, to the steering handle 20, by means of suitable fasteners. The fasteners may, for example, comprise a cord or tape. The storage bag 43 is preferably open at the top. Alternatively, or additionally, the storage bag 43 can be provided with one or more openings in the side. These openings can preferably be opened and closed, for example, using a zip fastener, hook-and-loop fastener or the like. When a person, for example, is going to go out shopping, the combined device 10 can thus be used as scooter to the shop, as handcart in which the goods are placed in the storage bag 43 in the shop, and as scooter or handcart on the way home from the shop with the goods in the storage bag. When the storage bag 43 is not in use, it can easily be put into the storage unit 41.

The rear part 45 of the combined device 10 comprises a first rear part side bar 47 and a second part rear side bar 51, and a forward rear part transverse bar 55, which at respective ends is fastened to the first rear part side bar 47 and the second rear part side bar 51, and a rearward rear part transverse bar 59, which at respective ends is fastened to the first rear part side bar 47 and the second rear part side bar 51.

Rearmost, seen in the longitudinal direction of the combined device, the first rear part side bar 47 and the second rear part side bar 51 are provided with a wheel fork 63. A rear wheel 64 is arranged in the wheel forks 63.

Figure 12:
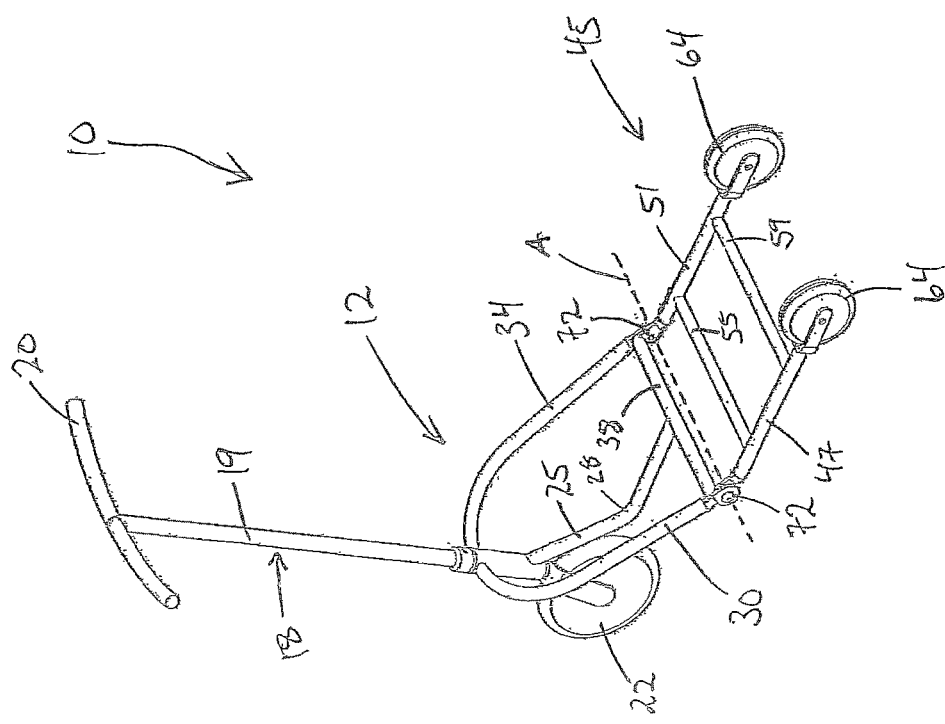
FIG. 12 shows an embodiment of the combined device without footplate and storage unit.
Figure 14:
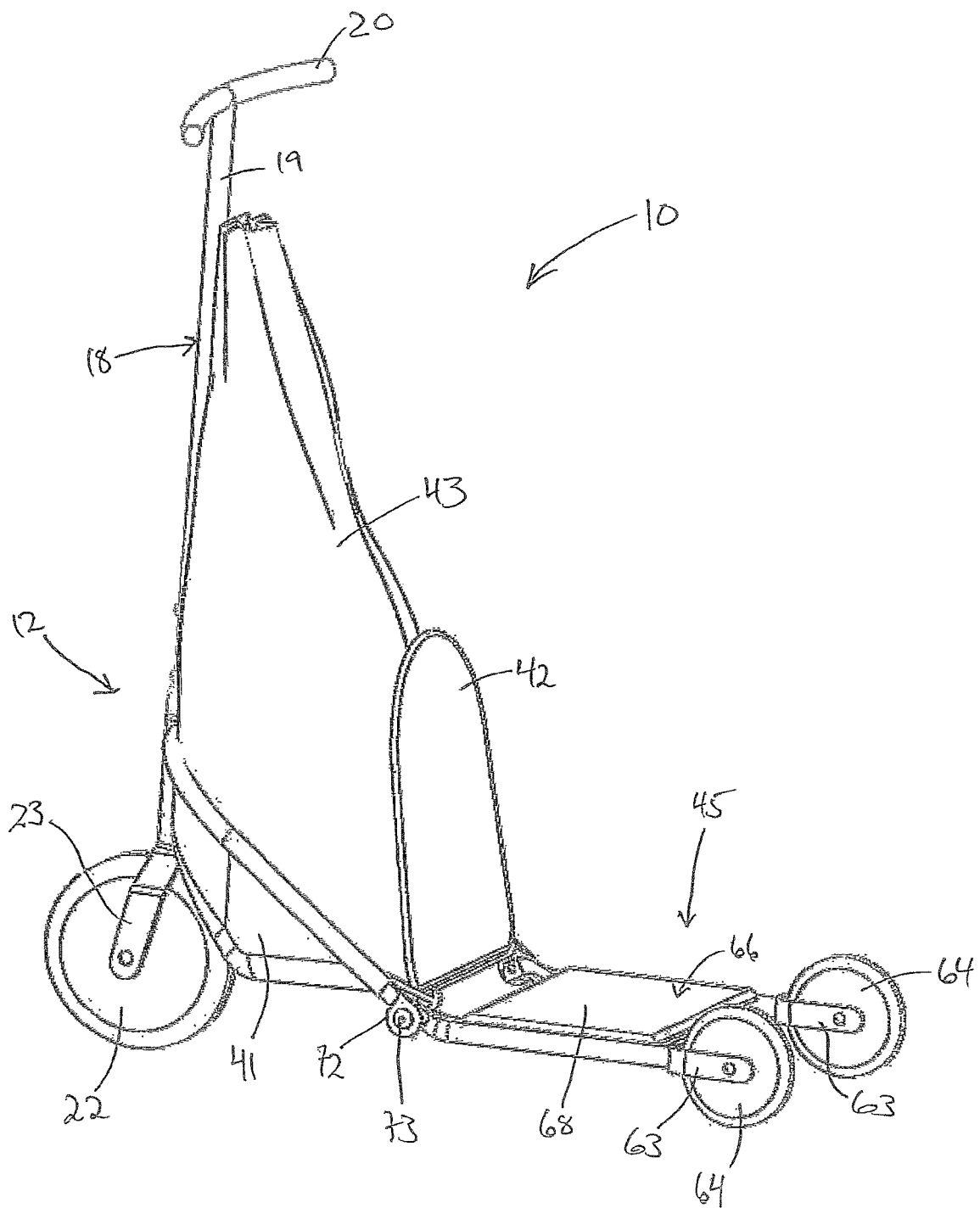
FIG. 14 is a perspective view of a second embodiment of the invention with a storage bag pulled up from a storage container.
Figure 16:
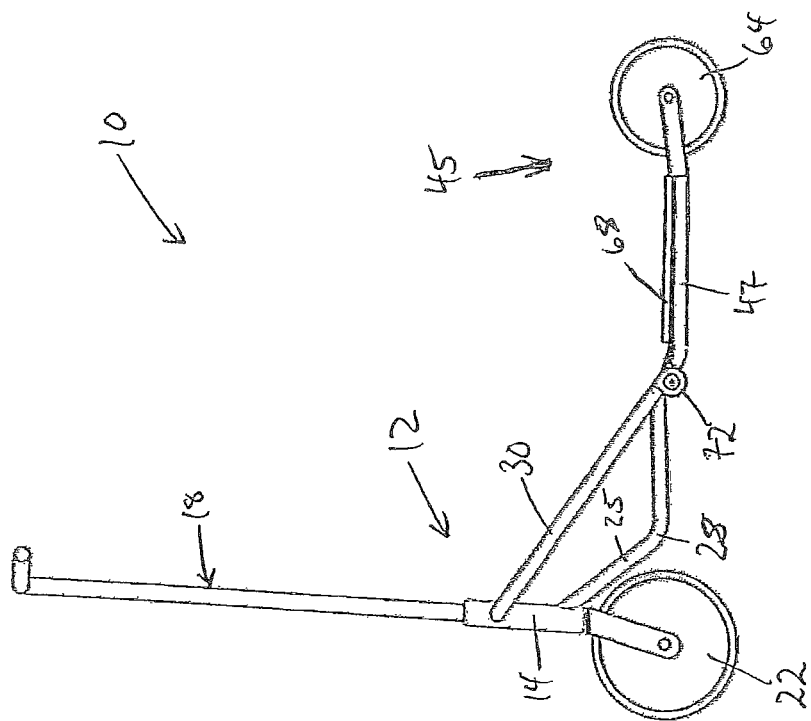
FIG. 16 shows the second embodiment of the invention in a scooter position.
Figure 15:
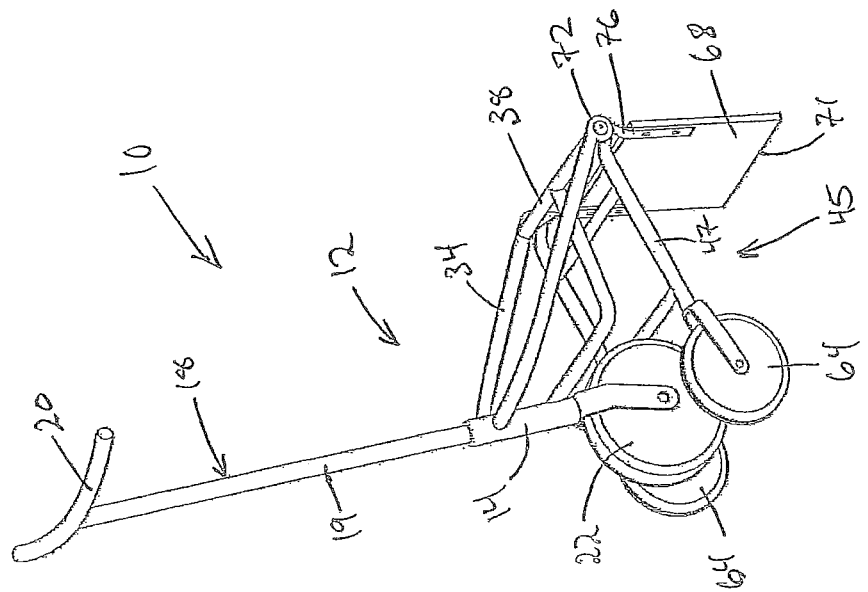
FIG. 15 shows the second embodiment of the invention in a handcart position.
Figure 17:
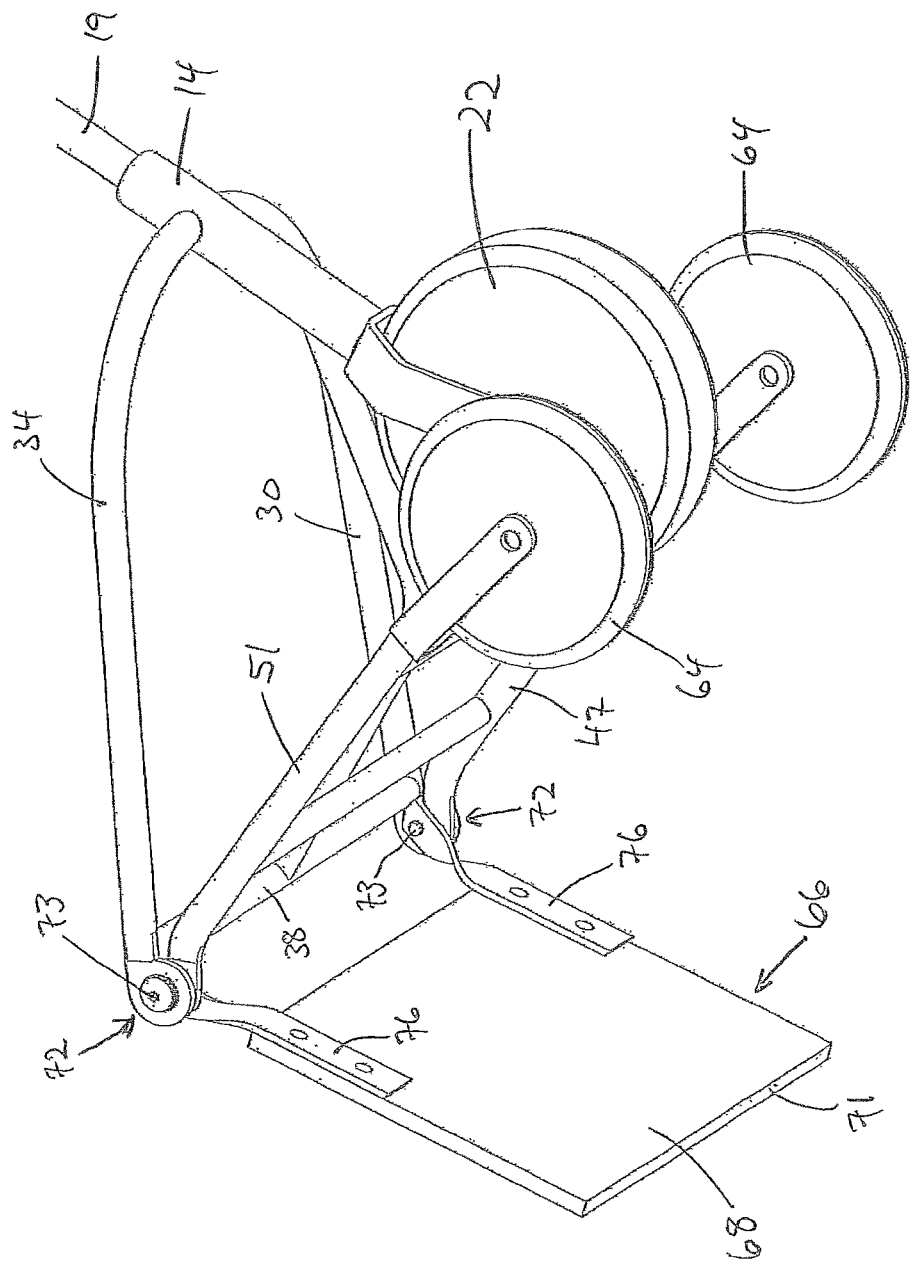
FIG. 17 is a sectional view, seen obliquely from below, of the second embodiment of the invention in a handcart position.
Figure 32:
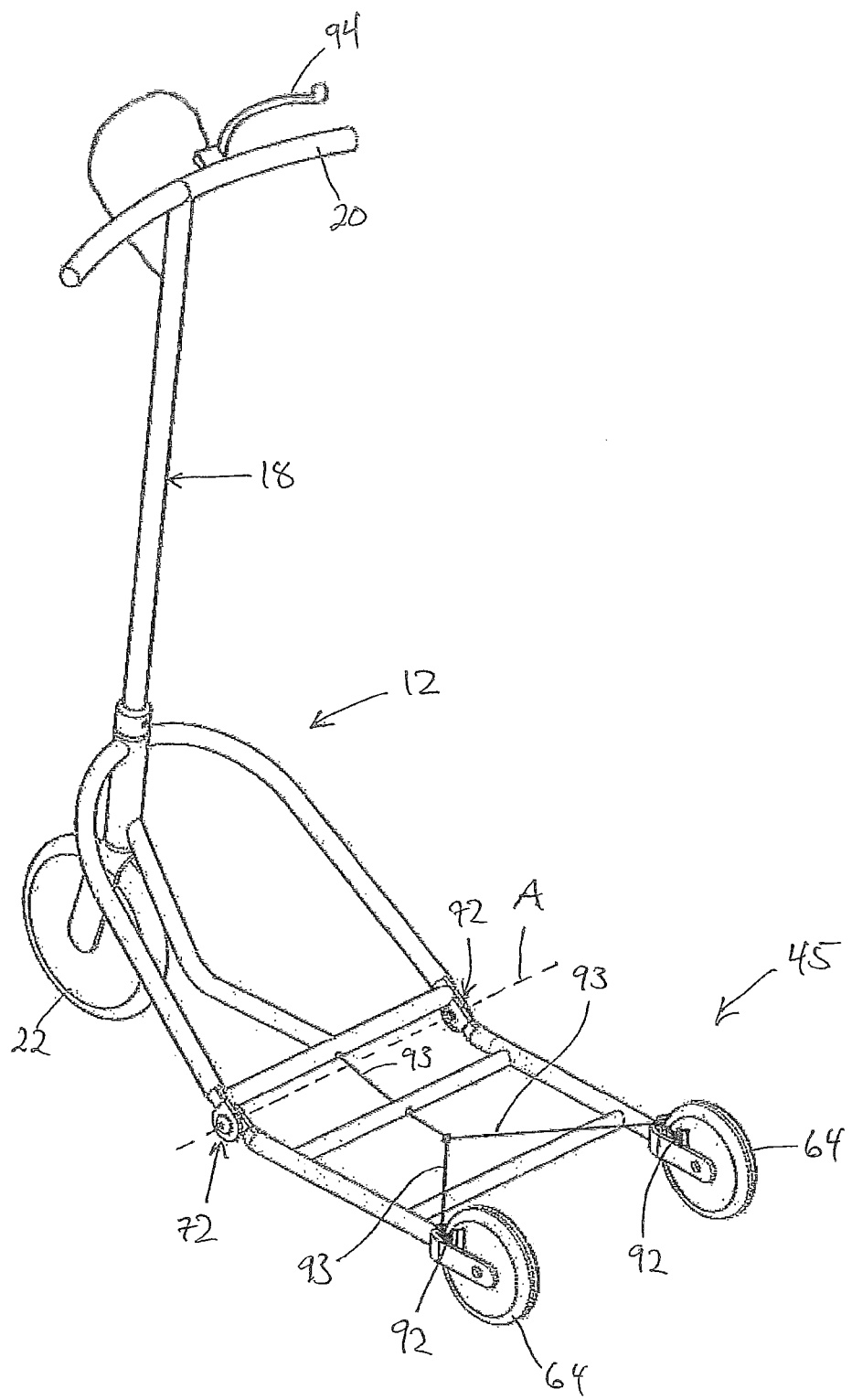
FIG. 32 shows a combined device provided with a brake device on the rear wheels that is operated from the handlebars of the combined device.
Figure 33:
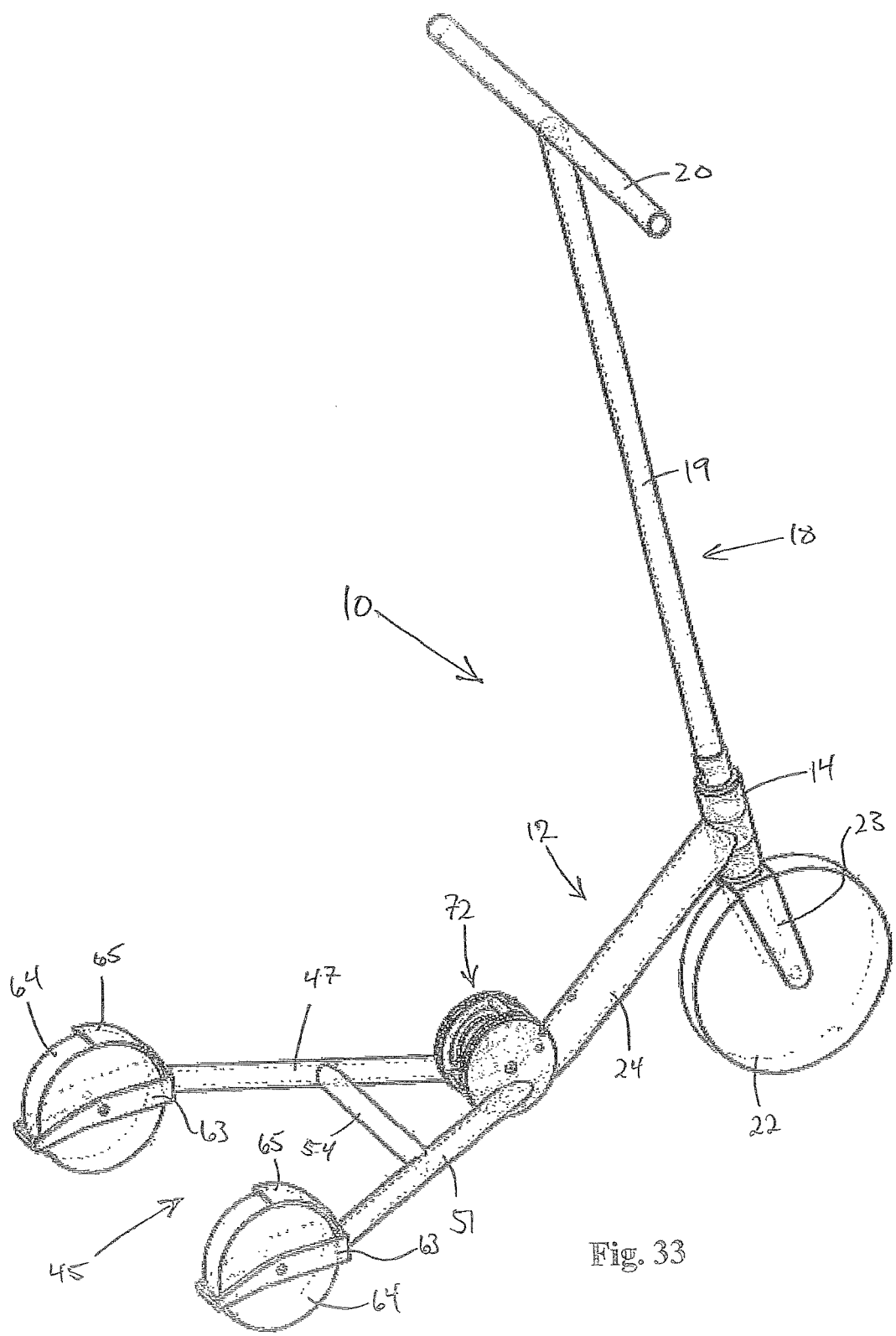
FIG. 33 is a perspective view of a third embodiment of the invention in the scooter position.

At a forward end, seen in the longitudinal direction of the combined device, the first rear part side bar 47 and the second rear part side bar 51 form a part of respective pivot joints 72. The pivot joints 72 have the same axis of rotation A as indicated in FIGS. 12 and 32.

Figure 13:
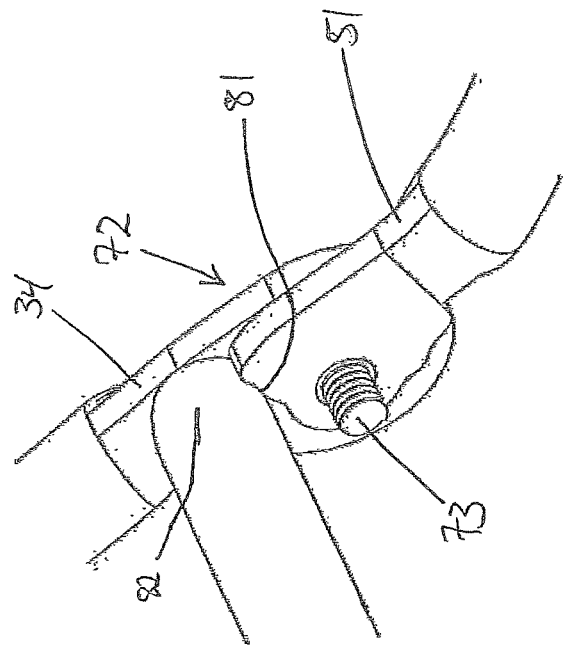
FIG. 13 shows in detail the pivot joint that connects the front part and the rear part of the combined device.

One of the pivot joints 72 is shown in detail in FIG. 13. As FIG. 13 illustrates, the second front part side bar 34 and the second rear part side bar 51 are connected by a bolt 73 that is passed through holes in the front part side bar 34 and rear part side bar 51.

As indicated in FIG. 13, the bolt 73 can be provided with threads for a nut. The front part 12 and rear part 45 of the combined device can thus be rotated relative to each other about the axis A through the bolt 73 as indicated in, for example, FIG. 12.

The pivot joint 72 is preferably configured such that further relative rotation between the front part 12 and the rear part 45 is prevented as the combined device moves into the scooter position during adjustment from the handcart position to the scooter position. This is achieved in that the rear part side bars 47, 51 are respectively provided with a rear part stop face 81. The rear part stop face 81 is preferably corrugated. One or more rear part stop elements 82, which cooperate with respective rear part stop faces 81, are arranged on the front part 12 such that the rear part stop faces 81 come into abutment against their respective rear part stop faces 82 as the combined device 10 finds itself in the scooter position. As indicated in FIG. 13, the rear part stop element 82 enters a corrugation valley and thus abuts against a corrugation crest on attempted further relative rotation between front part 12 and rear part 45. Thus, further relative rotation between the front part 12 and the rear part 45 is prevented when the combined device is in the scooter position and a user is standing on the rear part 45.

The rear part stop elements 82 may be a separate bolt or the like arranged on the front part side bars 30, 34. However, the rear part stop elements 82 consist preferably of the front part transverse bar 38. It must also be understood that it is of course possible to arrange the stop faces on the front part side bars 30, 34 and the stop element on the second rear part side bar 51.

The rear part 45 further comprises a plate means 66 that is arranged on a frame formed by the rear part side bars 47, 51 and the rear part transverse bars 55, 59. The plate means 66 can be fastened to the rear part side bars 47, 51 and/or the rear part transverse bars 55, 59 in a suitable manner, for example, by means of screws.

The plate means 66 is so adapted that a person is able to stand on the plate means 66 when the combined device is used as a scooter, and such that the plate means 66 acts as a support for the combined device 10 when it is used as a handcart so that the handcart remains steady in an upright position in which the steering device 18 is substantially vertical.

In the first embodiment of the present invention, the plate means 66 is configured with a foot part 68 and a support part 69. The foot part 68 and the support part 69 are arranged at an angle to each other such that the support part functions as a support for the combined device 10 when it is in an upright handcart position, i.e., that a user can put the combined device 10 in an upright position as, for example, shown in FIG. 11, and let go of the device without it falling over. In an upright position, the steering assembly 18 preferably projects upwards in a vertical or substantially vertical position.

The exact angle between the foot part and the support part will have to be determined in each individual case, but may be any angle between 0° and 90°. Preferably, the angle is close to 90° and in any case closer to 90° than to 0°. The magnitude of the angle between the foot part 68 and the support part 69 will also have to be seen in connection with the length of the support part 69, and the length and the angle will have to be adjusted to each other such that the combined device 10 remains steady in the upright handcart position with the aid of the support part 69. The length of the support part 69 must be understood here as the distance between the upper edge 70 of the support part 69 that lies against the underlying surface in the handcart position and the junction between the foot part 68 and the support part 69.

Figures 8, 9:
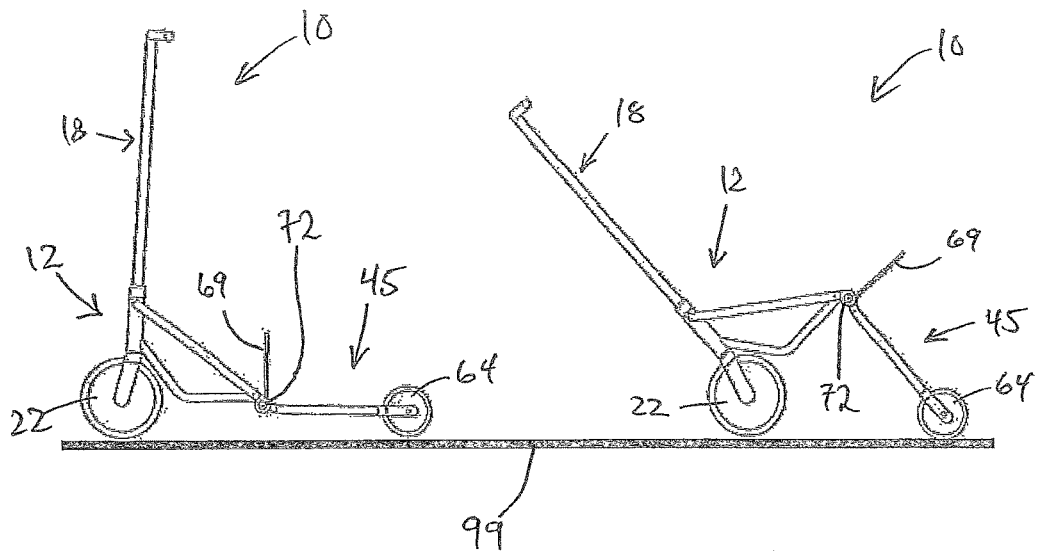
FIGS. 8-11 illustrate the adjustment of the first embodiment of the combined device from a scooter position to a handcart position.
Figures 10, 11:
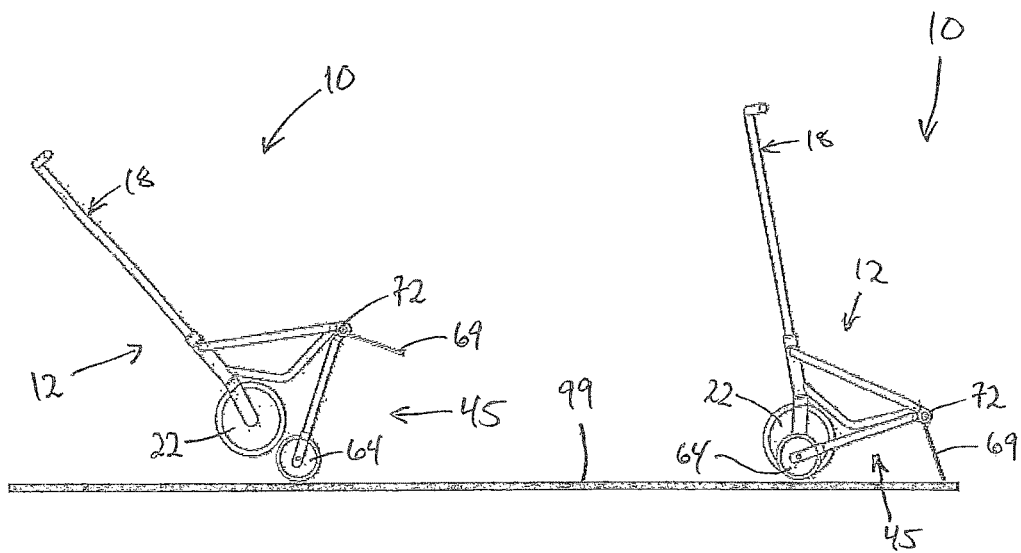

FIGS. 8-11 are four figures showing the adjustment of the combined device 10 from a scooter position, as shown in FIG. 8, to a handcart position, as shown in FIG. 11. In FIG. 9, the steering assembly has been pivoted down and forwards, and with that movement the pivot joints 72 and the axis of rotation A have been lifted up and the front part 12 rotated relative to the rear part 45. In FIG. 10, the rear wheels 64 have been pivoted over to the front wheel and the support part 69 is beginning to point towards the underlying surface 99. In FIG. 11 the steering assembly 18 has been righted again into a substantially vertical position. The rear part 45 now lies under the front part 12, whilst the upper edge 70 of the support part 69 rests against the underlying surface 99 and ensures that the combined device 10 stands steady by itself in the upright handcart position.

As can be seen in FIG. 11, the front part 12 and the rear part 45 are arranged such that it is only the rear wheels 64 that come into contact with the underlying surface 99 in the handcart position. Since the combined device 10 is provided with two rear wheels and only one front wheel, this will give better stability when the combined device 10 is used a handcart. With a different distribution of numbers of front wheels and rear wheels, where there are at least two front wheels that are able to provide sufficient stability when the device is used as a handcart, the front wheels will come into contact with the underlying surface whilst the rear wheel or wheels are arranged above the front wheels in the handcart position.

A second embodiment of the present invention is shown in FIGS. 14-27. As already mentioned, the front part 12 and the rear part 45, with the exception of the plate means 66, are identical in this embodiment and the embodiment described above. The features that are identical in the two embodiments will therefore not be described again below. This applies, inter alia, to the structure of the front part 12 and the rear part 45 with steering guide 14, front wheel fork 23 and front wheel 22, handlebar 18, front part side bars 30, 34, front part transverse bar 38, front part central bar 25, rear part side bars 47, 51, rear part transverse bars 55, 59, rear wheel forks 63 and rear wheels 64. The plate means 66 in the second embodiment of the invention and how the plate means functions on adjustment between the scooter position and the handcart position are shown clearly in FIGS. 17-23.

The plate means 66 comprises a support part 68 on which a user stands when the combined device 10 is used as a scooter, and which functions in the same way as the support part 69 in the first embodiment of the invention described above, when the combined device 10 is used as a handcart. The support part 68 is pivotally fastened to the two pivot joints 72 by means of fastening members 76. The fastening members 76 are preferably configured as elongate plate elements which at one end are fastened to the support part 68 by means of screws or another suitable fasteners, and at the other end are pivotally arranged in respective pivot joints 72. The support part 68 can thus rotate about the same axis A as the front part 12 and the rear part 45.

As indicated in the figures, one end of the fastening members 76 is turned 90° about the longitudinal axis of the fastening members relative to the other end so as thus to facilitate attachment to the support part 68 and in the pivot joint 72, respectively.

Like the front part side bars 30, 34 and the rear part side bars 47, 51, the fastening members 76 are provided with holes through which the connecting bolts 73 in respective pivot joint 72 are passed. Thus, the support part 68 is pivotally supported in the pivot joint 72 relative to both the front part 12 and the rest of the rear part 45.

Figure 21:
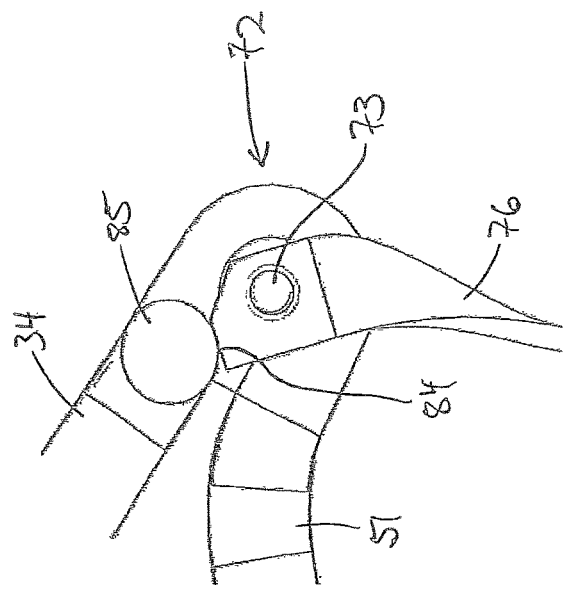
FIG. 21 shows the pivot joint that connects the front part and the rear part of the combined device, in a handcart position.
Figure 20:
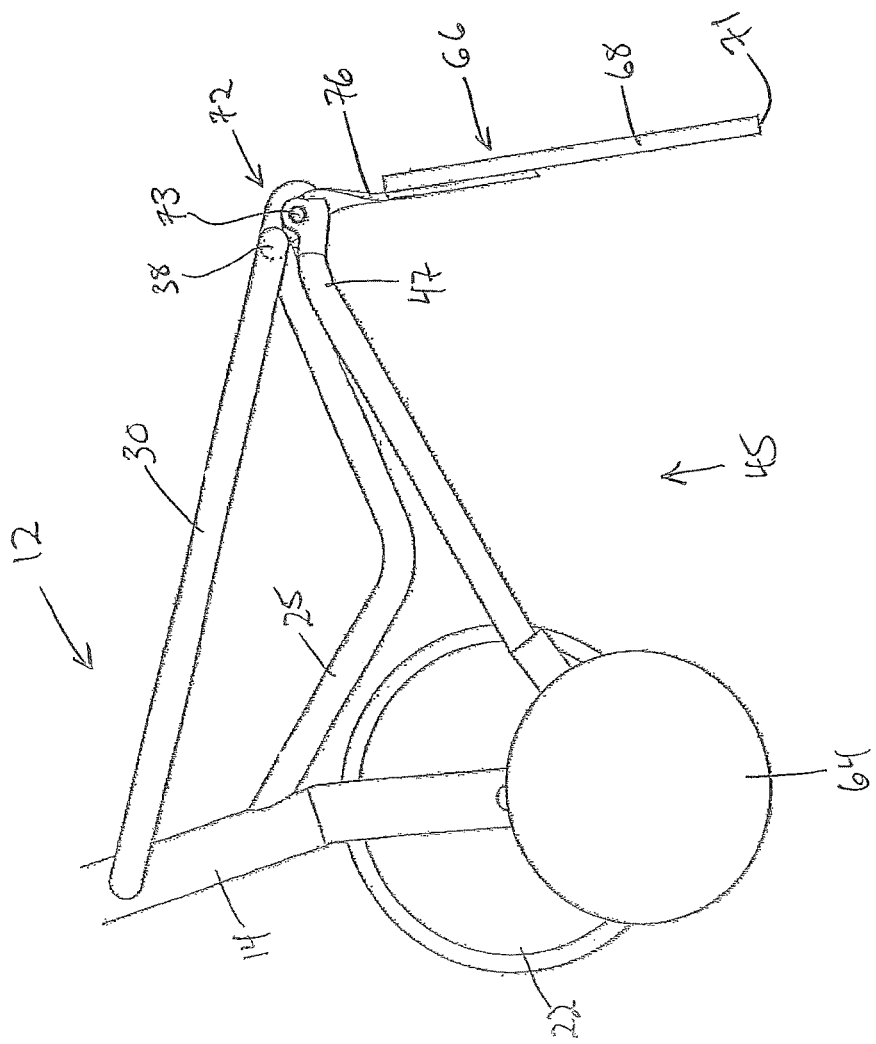
FIG. 20 is a side view of a section of the second embodiment of the invention in a handcart position.
Figure 22:
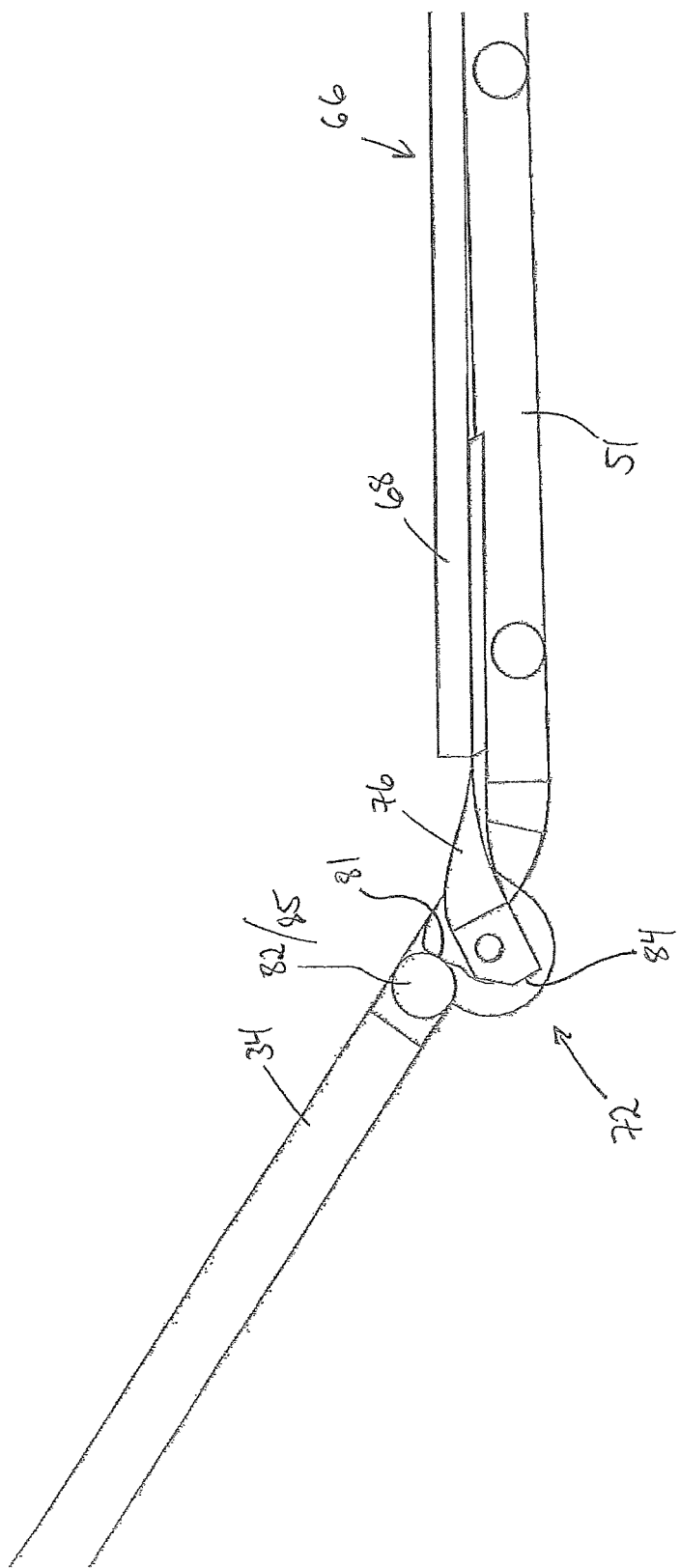
FIG. 22 shows the pivot joint that connects the front part and the rear part of the combined device, in a scooter position.
Figure 23:
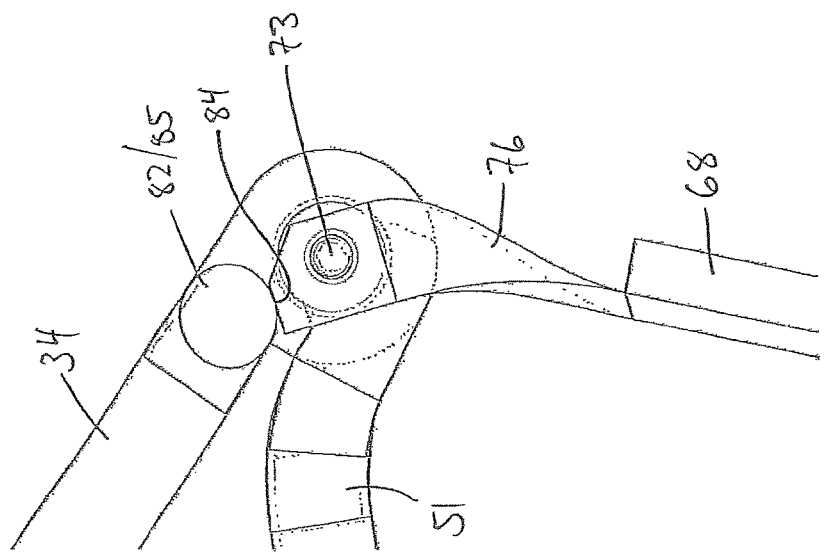
FIG. 23 shows the pivot joint that connects the front part and the rear part of the combined device, in a handcart position.

The fastening members 76 are preferably provided with a fastening member stop face 84, see FIGS. 19 and 21-22. The fastening member stop face 84 is configured such that it comes into abutment against a fastening member stop element 85 and prevents further rotation of the support part 68 relative to the front part 12, the support 68 having rotated to a desired position in which the support 68 functions as a support for the combined device 10 in the handcart position in the same way as the support part 69 in the first embodiment of the invention. The fastening member stop element 85 is arranged on the front part 12 and can advantageously be constituted of the front part transverse bar 38. In a practical embodiment of the invention, the front part transverse bar 38 can function as both rear part stop element 82 and fastening member stop element 85. Alternatively, the fastening member stop element 85 can be two separate bolts or the like that are fastened to the front part side bars 30, 34.

The support 68 is configured with a support edge 71 that will rest against the underlying surface when the combined device 10 is in an upright handcart position. The support edge 71 is preferably the rear edge of the support 68 seen in relation to the longitudinal direction of the combined device 10 when the combined device 10 is in the scooter position.

Figures 24, 25:
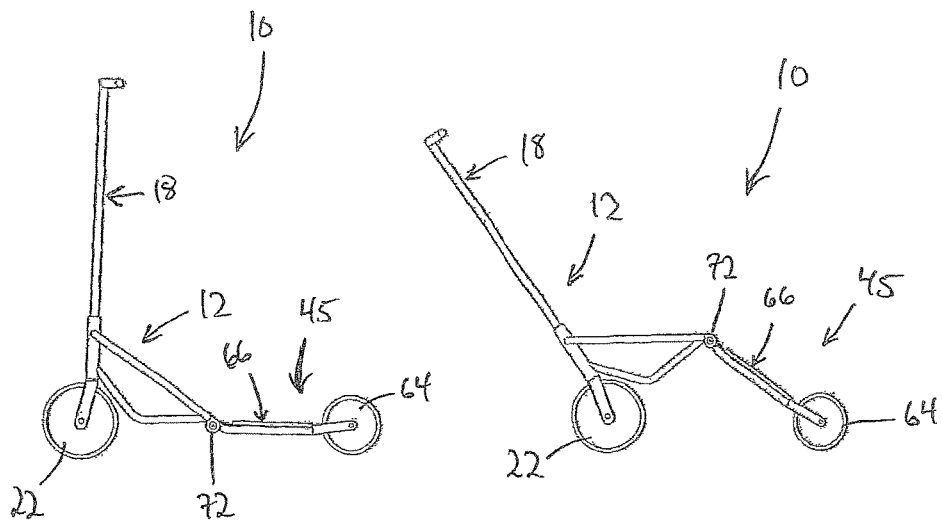
FIGS. 24-27 illustrate the adjustment of the second embodiment of the combined device from a scooter position to a handcart position.
Figures 26, 27:
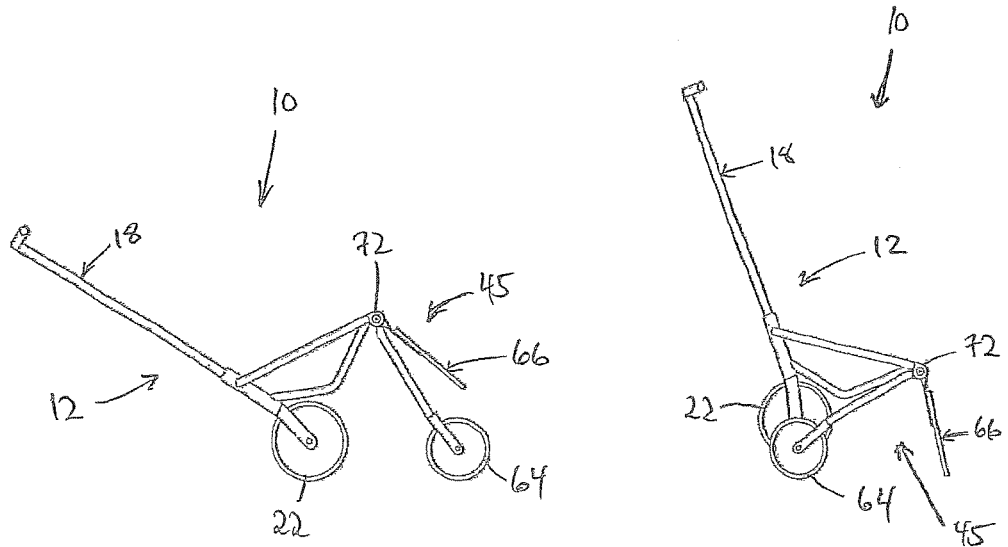

FIGS. 24-27 are a series of figures showing how the second embodiment of the combined device 10 is adjusted from the scooter position, as shown in FIG. 24, to the handcart position as shown in FIG. 27.

In the same way as with the adjustment of the first embodiment of the invention, shown in FIGS. 8-11, the steering assembly 18 is pivoted forwards and down, see FIG. 25. This results in the joint 72 being lifted and the front wheel 22 and the rear wheels 64 moving towards each other. At first, the plate means 66 will rotate together with the rear part 45 relative to the front part 12 as shown in FIG. 25, but as the fastening member stop face 84 comes into abutment with the fastening member stop element 85, which in the embodiment shown in the figures is constituted of the front part transverse bar 38, a further rotation of the plate means 66 relative to the front part 12 is prevented, as indicated in FIG. 26. When the adjustment of the combined device 10 has been completed, the rear part 45, with the exception of the plate means 66, lies under the front part 12 and the steering assembly 18 has been pivoted up again to a more or less vertical position. The support edge 71 of the plate means 66 will rest against the underlying surface and ensure that the combined device remains steady in an upright position as shown in FIG. 27. Because the combined device shown in the figures is provided with two rear wheels 64 and one front wheel 22, it is the rear wheels 64, as in the case of the first embodiment of the invention, that are in contact with the underlying surface in the handcart position, whilst the front wheel 22 is lifted up from the surface.

FIGS. 28-31 show an arrangement that can be used with both the described embodiments in order to lock the combined device against relative rotation between the front part 12 and the rear part 45 in the scooter position and the handcart position.

Figures 28, 29:
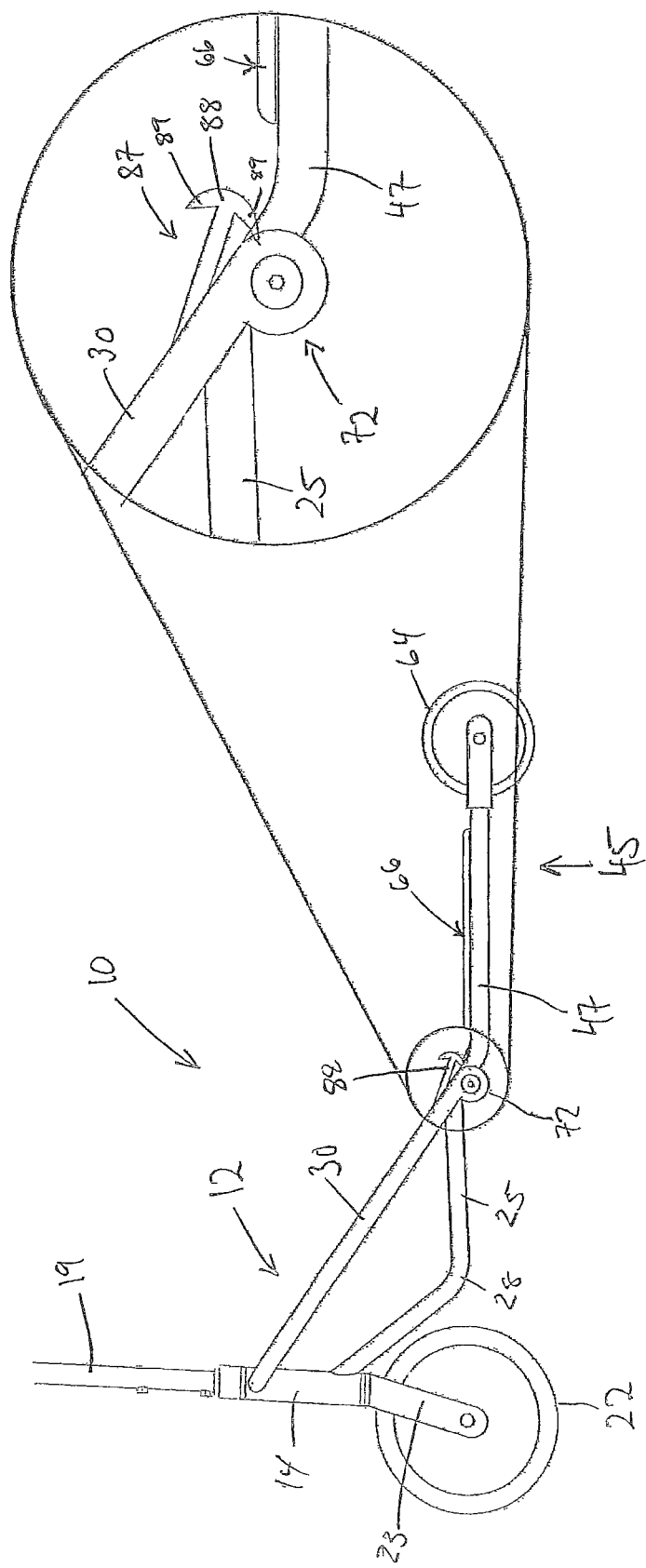
FIG. 28 shows a locking mechanism for locking the front part and the rear part against relative movement in a scooter position.
FIG. 29 shows a section of the area around the pivot joint as indicated in FIG. 28.
Figures 30, 31:
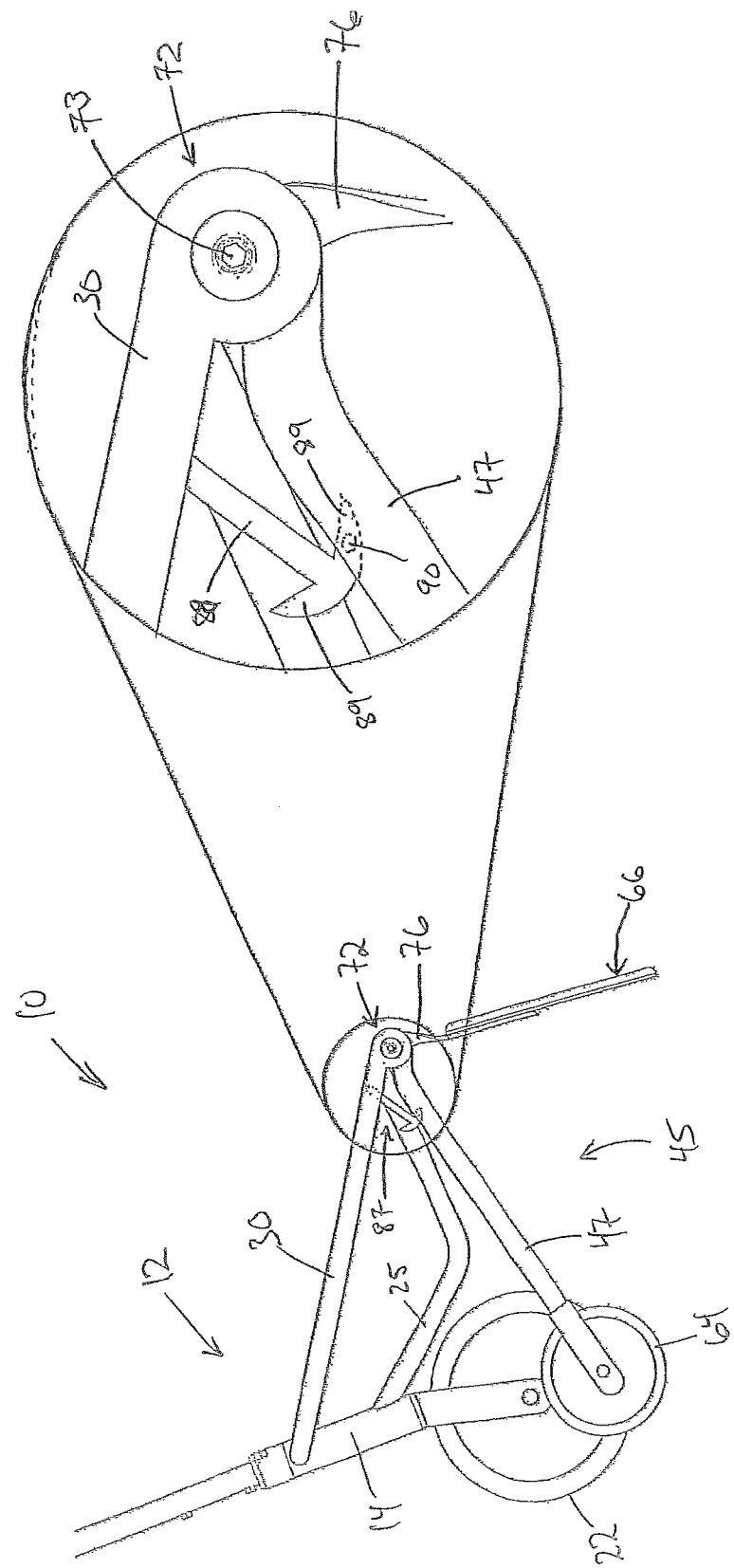
FIG. 30 shows the locking mechanism as shown in FIGS. 28-29 for locking the front part and the rear part against relative movement in a handcart position.
FIG. 31 shows a section of the area around the pivot joint as indicated in FIG. 30.

FIG. 28 shows a combined device 10 according to the present invention in a scooter position. FIG. 29 shows the area around the pivot joint 72 in FIG. 28. As shown in FIGS. 28 and 29, the combined device 10 is provided with a locking mechanism 87 that locks the front part 12 and the rear part 45 against relative rotation between them in the scooter position and the handcart position. The locking mechanism 87 comprises an anchor 88 that is rotatably secured to the front part 12. The anchor comprises hooks 89 that engage with locking bolts provided on the rear part 45. In FIGS. 28-29 it is indicated how the anchor 89 can be adapted to engage with a locking bolt (not shown) on the rear part 45 in order to lock the front part 12 and the rear part 45 against relative rotation between them in the scooter position. FIGS. 30-31 show how the anchor is pivoted to engage with a second locking bolt 90 in order to lock the front part 12 and the rear part 45 against relative rotation between them in the handcart position.

In FIG. 32 a combined device 10 is shown without the plate means 66. The combined device 10 is provided with a brake 92 on the rear wheels 64. It is possible to provide only one of the wheels 64 with a brake, but preferably both wheels are provided with a brake 92. The brake 92 is preferably operated by a brake lever 94 arranged on the steering handle 20 of the steering assembly 18. The brake lever 94 is preferably connected to the brake or brakes 92 by one or more wires 93, as indicated in FIG. 32.

The brakes 92 on the rear wheels 64 have at least two purposes. First, they will be used to reduce the speed when the combined device 10 is used as a scooter or on steep downhill slopes when the combined device 10 is used as a handcart. In addition, the brake will make it easier to adjust the combined device 10 between the scooter position and the handcart position. If the rear wheels 64 are locked by means of the brakes 92, the steering assembly 18 can easily be pivoted down and the front wheel 22 pushed towards the rear wheels 64 until the combined device 10 assumes the handcart position. Also, adjustment from the handcart position to the scooter position will be made easier for a user when the rear wheels 64 can be locked by means of the brakes 92 so that the front wheel can easily be pulled away from the rear wheels 64 until the combined device 10 assumes the scooter position.

In the figures, the combined device 10 is shown provided with one front wheel and two rear wheels. This is considered to provide the optimal solution as regards manoeuvrability and stability. There is, however, nothing to prevent the use of, for example, two front wheels and two rear wheels. More than two front wheels and/or rear wheels can also be used if so desired.

Although the two embodiments of the invention shown in the figures are provided with two pivot joints, there is of course nothing to prevent the front part and the rear part from being configured so that they are connected by a single pivot joint, as shown in the embodiment in FIGS. 33-38, or optionally by more than two pivot joints as long as all the pivot joints have a common axis of rotation.

FIGS. 33-38 show a third embodiment of the combined device 10. This embodiment is configured with only one pivot joint 72 and has a slightly simplified design in the front part 12 and the rear part 45. As shown in the figures, the front part 12 comprises a front part bar 24 which is fixedly connected to the steering guide 14, for example, by welding. The other end of the front part bar 24 is fastened to the pivot joint 72. This will be explained in more detail in connection with the description of FIGS. 36 and 37 below.

The steering assembly 18 may be configured in the same way as described above with a steering column 19 that is rotatably arranged in the steering guide 14 and is connected to a front wheel fork 23 at its lower end and a steering handle at its upper end. When a user holds the steering handle 20 and turns it, the front wheel 22 will thus be rotated correspondingly.

The rear part 45 comprises a first rear part side bar 47 and a second rear part side bar 51, both of which are connected at one end to the pivot joint 72. This will also be explained in more detail in connection with the description of FIGS. 36 and 37. At the other end of the rear part side bars 47, 51 are arranged rear wheel forks 63 which hold the rear wheels 64, as shown in the figures. The rear part 45 can further be provided with rear part transverse bar 54 to give the rear part greater stability. On top of the rear part 45 is arranged a plate means in the form of a foot part as shown in FIGS. 38a and 38c which, for example, can be secured to the rear part 45 by means of fastening screws or other suitable methods for securing the plate to the rear part. The plate means may also be provided with an upright edge in the same way as shown in FIGS. 1-11, with a length and an angle relative to the footplate that is able to give the combined device 10 a stable position in the handcart position such that the device remains steady without a user having to hold it.

Figure 36:
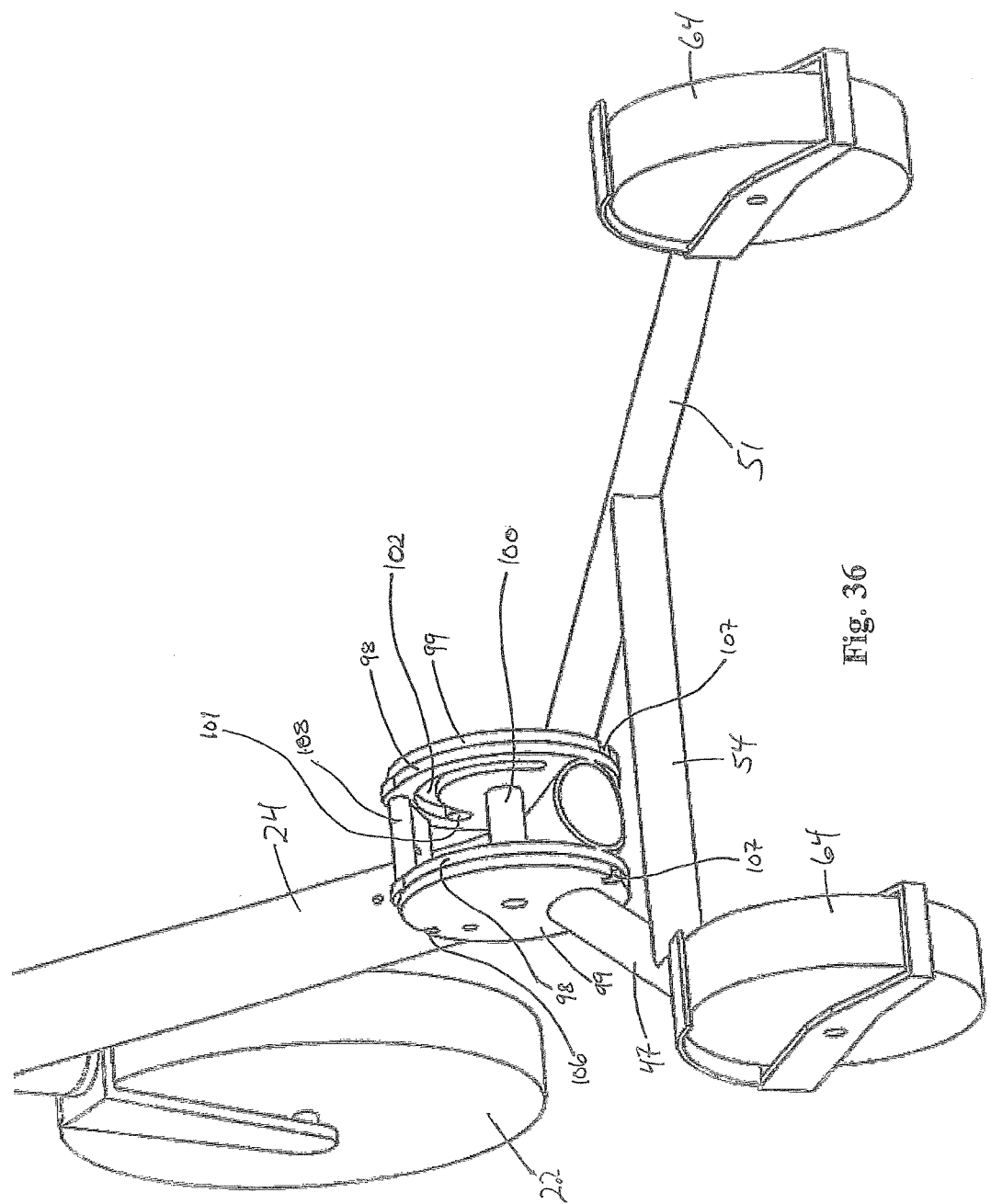
FIG. 36 is a perspective view, seen essentially from behind, of a third embodiment of the invention in the scooter position.
Figure 37:
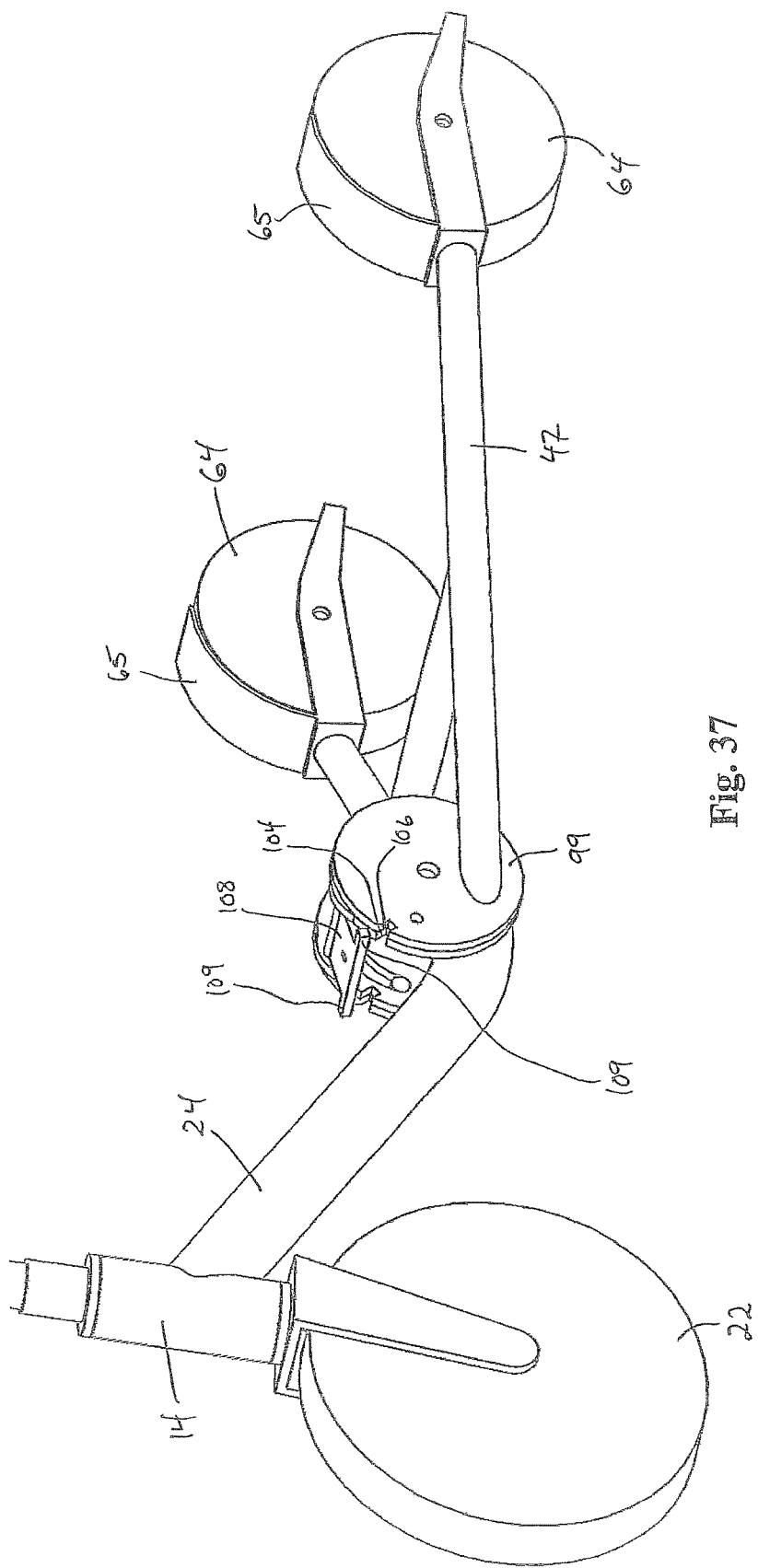
FIG. 37 is a perspective view, seen essentially from in front, of a third embodiment of the invention in the scooter position.

The pivot joint 72 may be configured as shown in FIGS. 36 and 37. In FIG. 36 two inner elements 98 are shown that are fastened to an end portion of the front part 24, one inner element on each side of the front part 24 as shown. The inner elements may, for example, be welded to the front part 24. The inner elements 98 are arranged on a shaft 100, and are configured with a depression 102 that extends in a circular path around the shaft 100. The depressions may, for example, be grooves or recesses.

The pivot joint 72 further comprises two outer elements 99, the two outer elements 99 being arranged on the outer side of their respective one of the two inner elements 98. The two outer elements 99 are also arranged on the shaft 100 such that the inner elements 98 and the outer elements 99 can be rotated relative to each other about the axis through the shaft 100. One of the two outer elements 99 is fastened to the first rear part side bar 47, for example, by welding, whilst the other outer element 99 is fastened to the second rear part side bar 51, for example, by welding. As the inner elements 98 and the outer elements 99 rotate relative to one another, they preferably have a circular configuration and the same diameter, as is indicated in the figures.

Figure 34:
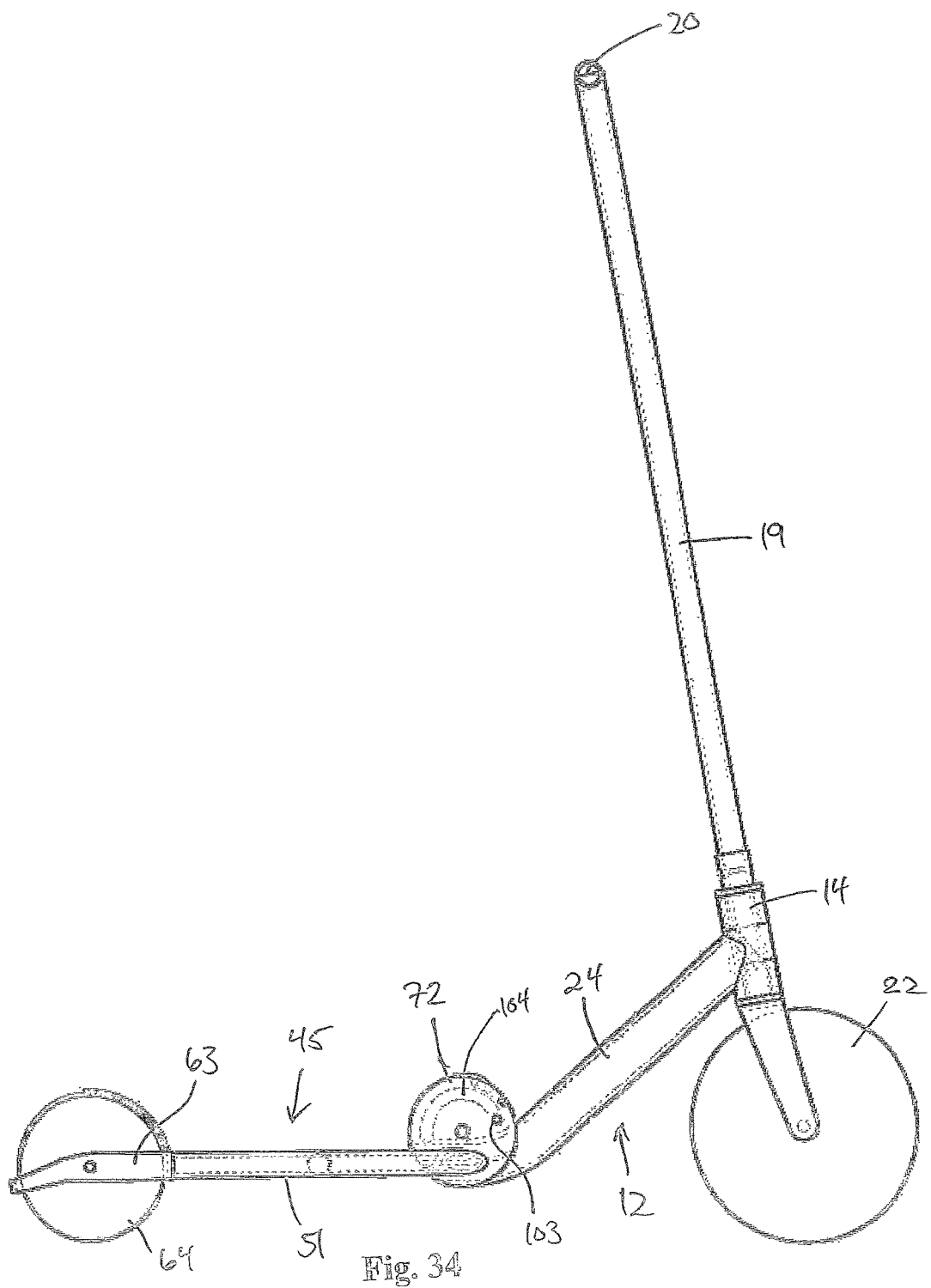
FIG. 34 is a side view of the third embodiment of the invention in the scooter position.
Figure 35:
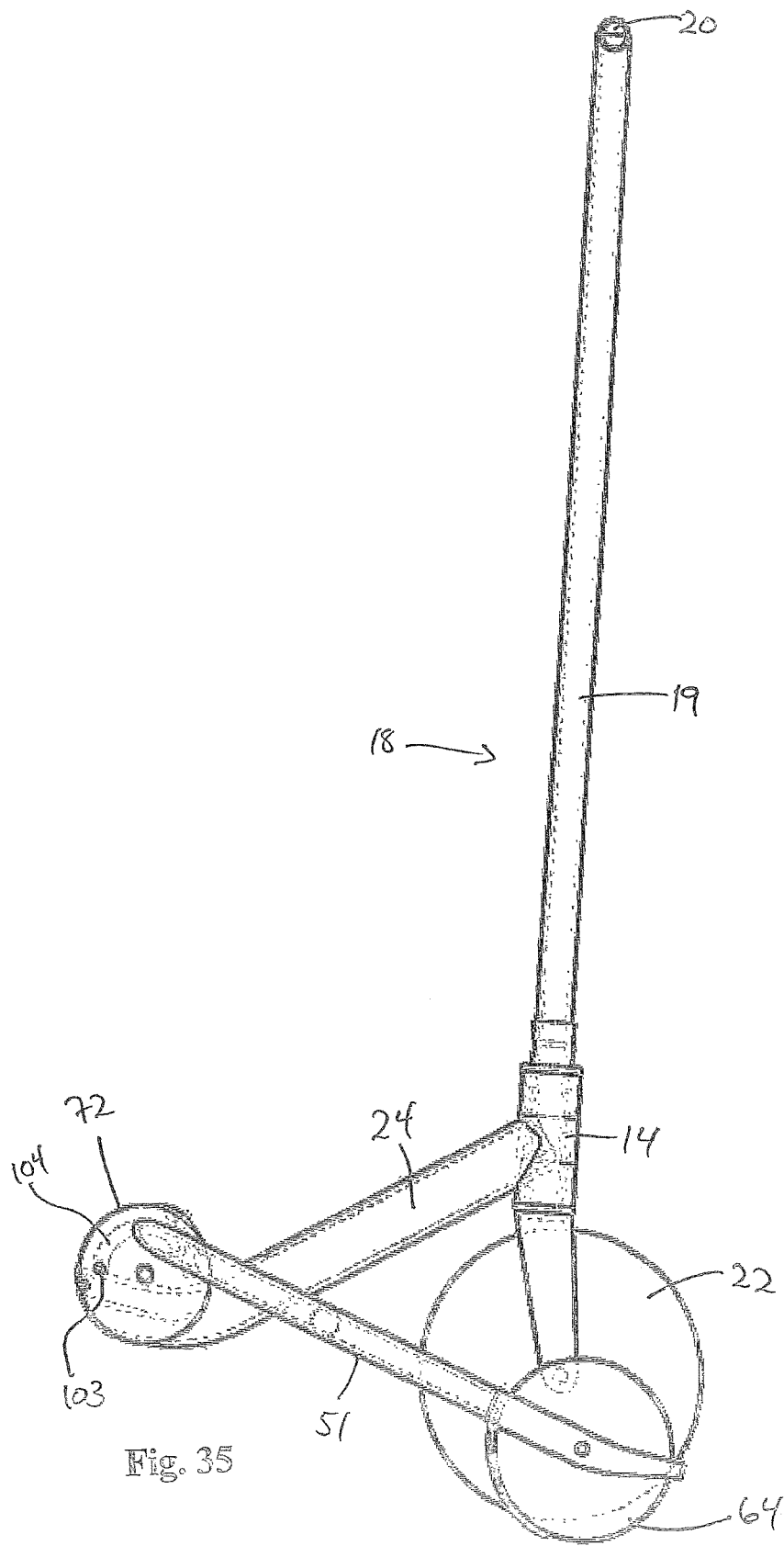
FIG. 35 is a side view of the third embodiment of the invention in the handcart position.

At least one of the outer elements, but preferably both the outer elements 99 are provided with a projection 101 that projects into the respective depressions 102 in the inner elements 98. The projection may, for example, be a pin or a similar element. As shown in FIG. 36, the projection 101 butts against one end of the depression 102 when the combined device is in the scooter position and prevents further relative rotation between the front part 12 and the rear part 45 when a user stands on the footplate (not shown). As indicated in FIGS. 34 and 35, the projections 101 will follow the depressions 102 during the adjustment from the scooter position as shown in FIG. 34 to the handcart position as shown in FIG. 35. In the handcart position, the projection 101 butts against the opposite end of the depression 102 compared with the scooter position and thus prevents further relative rotation between the front part 12 and the rear part 45. The length of the depression 102 therefore determines how much relative rotation between front part and rear part is possible.

To lock the combined device 10 against relative movement between the front part 12 and the rear part 45 in the scooter position and the handcart position, the pivot joint 72 can be provided with a locking mechanism 96 that is shown most clearly in FIGS. 36 and 37. The locking mechanism 96 comprises a locking element 108 that lies between the two inner elements 98 and is rotatably fastened at one end to the two inner elements 98. At the opposite end of the locking element 108, the element is provided with at least one locking element projection, but preferably two locking element projections 109 that project out towards the outer elements 99. Furthermore, the inner elements are configured with recesses 104 at the outer edge, seen radially, of the inner elements, which have a shape into which the locking element projections 109 fit. The outer elements 99 are configured with respective first recesses 106 and second recesses 109 at the outer edges, seen radially, of the outer elements, which have a shape into which the locking element projections 109 fit. The recesses 104 on the inner elements and the recesses 106 on the outer elements are so arranged on their respective elements that they are aligned in the scooter position, whereby the locking element projections 109 of the locking elements can be inserted into the recesses 104, 106 and thus prevent the front part 12 from rotating relative to the rear part 45. The locking element 108 can advantageously be spring-loaded such that the locking element projections 109 do not inadvertently pop out of the recesses 104, 106.

When the combined device 10 is then to be adjusted to the handcart position, the locking element 108 must be lifted up before the rear part 45 and the front part are rotated relative to each other until the handcart position is reached. In the handcart position, the recesses 104 on the inner elements will be aligned with the second recesses 107 on the outer elements 99. The locking element 108 has rotated together with the inner elements 98, and thus the locking element projections 109 can be inserted into the aligned recesses 104, 107, and thereby prevent the front part 12 from rotating relative to the rear part 45.

The embodiment shown in FIGS. 33-38 can also advantageously be provided with a brake, for example, a brake like the brake shown in FIG. 32 where the wire can be passed though the front part bar 24 and out through the opening in the end of the front part bar. The wire can then be arranged through the rear part transverse bar 54 and thereafter branch out to the two rear wheels as shown in FIG. 32. Other brake types may also be used. For example, a fender 65 may be used that is flexible and that is arranged over the rear wheels 64 such that a user can step on the fender, thereby pressing it down against the rear wheel 64 so that friction between the fender 65 and the wheel 64 gives the desired braking effect. Optionally, it is possible to apply a friction-enhancing coating on the fender 65 which will increase the friction between the wheel 64 and the fender 65 when the fender is pressed down against the wheel.

The embodiment in FIGS. 33-37 is not shown with any storage device. However, a storage device can easily be fastened to the front part 24 and optionally to the steering column 19. The storage device can be made of a rigid material as, for example, plastic, or as a bag of a soft material that can be put into and pulled out of a smaller storage unit capable of being arranged on the front part 24. Such a solution is shown, for example, in FIG. 1.

In FIGS. 38a-c a combined device 10 is shown with a storage unit 41. The storage unit can be configured so that it is able to assume several positions of use. FIG. 38a shows a position in which the storage unit 41 is large and can hold many items, for example, after a shopping trip. In FIG. 38b, the storage unit 41 is shown in a position in which it functions as a shoulder bag. As illustrated in the figure, the storage unit 41 can be equipped with a shoulder strap 37, enabling the storage unit to be carried over the shoulder when the combined device is not being used. In FIG. 38c, it is indicated that the storage unit 41 can also be arranged in a folded position when the storage unit is arranged on the combined device 10 and there is no need for as large a volume for storage of items as shown in FIG. 38a. The position of the storage unit shown in FIG. 38c can be used when, for example, a tablet, portable computer, paper files and/or other smallish items are to be transported.

FIGS. 38a-c also show that the third embodiment is equipped with a plate means in the form of a foot part. The foot part may, for example, be configured in plastic and preferably have a shape that allows it to lie on, and optionally be fastened to, the first rear part side bar 47 and the second rear part side bar 51. Other materials can of course also be used to make the foot part. If so desired, the foot part can also be configured so that it covers the pivot joint 72, thereby protecting the pivot joint from impact, dirt etc. The foot part can also be mounted so as to be pivotal in the same way as shown in FIGS. 15-27 such that the foot part functions as a support part 68 when the combined device 10 is in an upright handcart position, thereby enabling the combined device to remain steady without any great risk of tipping over.

In FIGS. 15-27 it is shown that the support part 68 is rotatably fastened to the pivot joints 72 by means of fastening members 76. It is also conceivable that instead of using separate fastening members 76, the support part 68 can be provided with an upward projecting or downward projecting edge that can be fastened to the pivot joint 72. It is also possible to allow only a portion of the support part to be rotatably fastened to the pivot joint 72 whilst the rest of the plate means 66 is fixedly secured to the rear part 45. By allowing the rotatable support part 68 to rest in a recess in the part of the plate means that is fixedly secured to the rear part, the whole of the plate means will appear as a single foot part in the scooter position, whilst in the handcart position the rotatable support part 68 will only rotate to a certain point on adjustment from the scooter position to the handcart position as explained above and thus function as a support part such that the handcart is able to stand upright without tipping over.

In the last two FIGS. 39a and 39b, two variants of a combined device are shown with a plate means comprising one or two foot parts 202 and a support part 200, where the support part and the foot parts are separate parts. The support part 202 is preferably fastened to the pivot joint 72 in the same way as described above. The plate means may comprise two foot parts 202, which two parts are fastened to respective right-hand and left-hand sides of the rear part. Alternatively, the foot parts can be configured as a single piece, and in that case connected, for example, via a part that lies over and protects the pivot joint.

As shown in FIG. 39a, the support part 200 may be configured as a bolt device comprising two longitudinal bars which at their first ends are rotatably connected to the pivot joint 72 as explained above, and their second ends are fastened to a transverse bolt. Alternatively, the support part 200 can, as indicated in FIG. 39b, be constituted of a plate-shaped device that is rotatably connected to the pivot joint 72.

In both embodiments in FIGS. 39a and 39b, the support device 200 preferably lies level with the foot part or parts 202 in the scooter position. On adjustment from the scooter position to the handcart position, the rotatable support part 200 is tilted up relative to the foot part or parts 202 until a certain point where a stop face on the support part comes into abutment against a corresponding stop face on the front part or the pivot joint such that the support part functions as a support for the combined device in the handcart position.

It is not shown in the figures, but all the embodiments of the combined device 10 may also be provided with a motor for propulsion. The motor is preferably an electric motor with drive on the front wheel 22. The steering guide 14 and/or the steering column 19 can be employed as battery holder, whilst the motor itself is preferably arranged in the front wheel 22.

It should be evident from the description of the three examples above that the present combined device is highly suitable both as scooter and as handcart with a storage device, such as a storage bag, as the steering column remains relatively vertical during the whole adjustment process between the scooter position and the handcart position, and vice versa. There is therefore little chance of something falling out of the storage device.

The invention claimed is:

1. A combined device adapted for adjustment between a scooter position and a handcart position, the combined device comprising:
   a front part provided with a steering assembly and at least one front wheel; and a rear part provided with at least two rear wheels,
wherein the at least two rear wheels comprise a rear rotation axis,
wherein the combined device further comprises one pivot joint having an axis of rotation or a plurality of pivot joints with a common axis of rotation fixed relative to the front part and/or rear part,
wherein the front part is rotatably connected to the rear part at the one pivot joint or at the plurality of pivot joints with the common axis of rotation (A), such that on adjustment from a scooter position to an upright handcart position, the rear wheels and the at least one front wheel are moved towards and against each other such that the rear wheels are in contact with an underlying surface in the handcart position, and such that the combined device is wheeled on the rear wheels in the handcart position,
wherein the axis of rotation or the common axis of rotation (A) is both substantially parallel with the rear rotation axis and the only axis of rotation facilitating pivoting, each when bringing the combined device between the scooter position and the upright handcart position, and
wherein the combined device further comprises a plate means that is connected to the rear part such that a user is able to stand on the plate means when the combined device is in the scooter position.

2. The combined device according to claim 1, wherein at least a part of the plate means functions as a support for the combined device when the combined device is standing in the upright handcart position.

3. The combined device according to claim 2, wherein the plate means comprises a foot part on which a user can stand in the scooter position and a support part that projects up from the foot part such that the support part functions as support for the combined device when it is standing in the upright handcart position.

4. The combined device according to claim 2, wherein the plate means comprises a support part pivotally connected to the pivot joint or pivot joints such that the support part functions as a support in an upright handcart position, and at least one separate foot part that is fastened to the rear part.

5. The combined device according to claim 2, wherein the plate means comprises a support part that is pivotally connected to the pivot joint or pivot joints such that the support part functions as a support in an upright handcart position.

6. The combined device according to claim 5, wherein the plate means in its entirety is constituted of the support part and adapted such that a user can stand on the support part in the scooter position.

7. The combined device according to claim 5, wherein the plate means comprises the support part and a separate foot part that is fastened to the rear part, which support part lies in a recess in the foot part in the scooter position.

8. The combined device according to claim 5, wherein the combined device further comprises at least one elongate fastening member which at one end is connected to the support part and which at the other end is connected to the pivot joint or one of the pivot joints.

9. The combined device according to claim 8, wherein the fastening member or the support part is configured with a stop face that comes into abutment against a corresponding stop face on the front part before the rotation from scooter position to handcart position is completed such that rotation of the support part stops and the support part thus functions as a support in the upright handcart position.

10. The combined device according to claim 5, wherein the at least one fastening member is configured with a fastening member stop face that is adapted such that the fastening member stop face comes into abutment against a fastening member stop element and limits rotation of the support part when the combined device is in the handcart position, which fastening member stop element is arranged on the front part of the combined device.

11. The combined device according to claim 1, wherein the steering assembly comprises a steering column which in the scooter position is directed upwards relative to an underlying surface and which is connected to the at least one front wheel at a lower end of the steering column.

12. The combined device according to claim 11, wherein the front part comprises a steering guide that is fixedly connected to the front part, in which steering guide the steering column is rotatably arranged about the longitudinal axis of the steering column through the steering guide.

13. The combined device according to claim 1,
wherein the pivot joint comprises two inner elements that are fixedly connected to the front part and two outer elements that are arranged on opposite sides of their respective inner element and are fastened to the rear part, and
wherein the inner elements and/or the outer elements are rotatable about the axis of rotation (A).

14. The combined device according to claim 13, wherein the inner elements and/or the outer elements are rotatably arranged on one shaft or a plurality of shafts having the same axis of rotation.

15. The combined device according to claim 13,
wherein the inner elements comprise a projection, and
wherein the outer elements comprise a corresponding depression into which the projections respectively project and along which they move when the combined device is adjusted between the scooter and handcart positions, and
wherein the length of the depression is such that the projections butt against respective ends of the depressions in respectively the scooter position and the handcart position.

16. The combined device according to claim 1, wherein the pivot joint is provided with a locking mechanism that locks the front part and the rear part against relative rotation between them in respectively the scooter position and the handcart position.

17. The combined device according to claim 13,
wherein the inner elements are provided with a recess and the outer elements are provided with respective first recesses and second recesses,
wherein the recesses of the inner elements and the first recesses of the outer elements are aligned when the combined device is in the scooter position, and the recesses of the inner elements and the second recesses of the outer elements are aligned with each other when the combined device is in the handcart position, and
wherein the pivot joint comprises a movable locking element with locking element projection that has a shape adapted to the recesses and that can be inserted into the aligned recesses in respectively the scooter position and the handcart position so as to lock the front part and the rear part against relative movement between them.

18. The combined device according to claim 1, wherein the front part of the combined device is provided with a storage unit behind handlebars of the combined device seen in relation to the longitudinal direction of the combined device in the scooter position.

19. The combined device according to claim 18, wherein the storage unit comprises a storage bag that is adapted to be able to be stored in the storage unit and be pulled up and fastened to the steering assembly.

20. The combined device according to claim 1, wherein, in the handcart position, the rear wheels are pivoted in towards and against the at least one front wheel so that the rear wheels lie wholly or partly under the at least one front wheel in the handcart position.

\* \* \* \* \*